United States Patent
Ma et al.

(10) Patent No.: US 6,754,146 B2
(45) Date of Patent: Jun. 22, 2004

(54) ERROR SIGNAL DETECTION APPARATUS FOR AN OPTICAL RECORDING/ REPRODUCTION SYSTEM

(75) Inventors: Byung-in Ma, Gyeonggi-do (KR); In-sik Park, Gyeonggi-do (KR); Chong-sam Chung, Gyeonggi-do (KR); Jin-hoon Jeon, Gyeonggi-do (KR); Tae-yong Doh, Gyeonggi-do (KR); Byoung-ho Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 09/986,454

(22) Filed: Nov. 8, 2001

(65) Prior Publication Data

US 2002/0060970 A1 May 23, 2002

(30) Foreign Application Priority Data

Nov. 17, 2000 (KR) ........................................ 2000-68501

(51) Int. Cl.$^7$ ................................................ G11B 7/00
(52) U.S. Cl. ............................. 369/44.41; 369/53.19; 369/44.32; 369/44.37
(58) Field of Search ........................... 369/44.37, 44.32, 369/109.02, 120, 44.13, 53.19, 44.41

(56) References Cited

U.S. PATENT DOCUMENTS

| | | | | |
|---|---|---|---|---|
| 4,785,441 A | * | 11/1988 | Tanaka et al. ............... 369/44 |
| 5,151,887 A | * | 9/1992 | Miyazaki ................. 369/44.32 |
| 5,699,334 A | * | 12/1997 | Yamada et al. .......... 369/44.32 |
| 5,719,847 A | * | 2/1998 | Tateishi et al. ............. 369/124 |
| 5,737,296 A | * | 4/1998 | Komma et al. ............. 369/103 |
| 5,789,947 A | * | 8/1998 | Sato ............................. 327/3 |
| 5,881,034 A | * | 3/1999 | Mano et al. ............. 369/44.14 |
| 5,901,120 A | * | 5/1999 | Matsui ..................... 369/44.28 |
| 6,147,941 A | * | 11/2000 | Kumagai ................. 369/44.26 |
| 6,314,068 B1 | * | 11/2001 | Sano et al. ............... 369/44.32 |
| 6,370,095 B1 | * | 4/2002 | Ogasawara ............. 369/53.19 |
| 6,510,111 B2 | * | 1/2003 | Matsuura ................. 369/44.32 |
| 6,657,930 B1 | * | 12/2003 | Nomoto .................... 369/44.28 |

OTHER PUBLICATIONS

U.S. patent application Ser. No. 09/984,886, Kim et al., filed Oct. 31, 2001.
U.S. patent application Ser. No. 10/374,715, Kim et al., filed Feb. 25, 2003.

* cited by examiner

*Primary Examiner*—Doris H. To
*Assistant Examiner*—Gautam R. Patel
(74) *Attorney, Agent, or Firm*—Staas & Halsey LLP

(57) ABSTRACT

An error signal detection apparatus for an optical recording/reproducing system including a light source emitting a light beam and an objective lens focusing the light beam to form a light spot on a recording medium, the apparatus including: a photodetecting unit dividing at least a part of the light beam passed through the objective lens after being reflected/diffracted from an information stream of the recording medium into light beam portions, and detecting the light beam portions; and a signal processor detecting phase differences between detection signals from the light beam portions to detect a tangential error signal, a defocus error signal, and/or a radial tilt error signal.

10 Claims, 25 Drawing Sheets

RADIAL TILT

TANGENTIAL TILT

RADIAL TILT

TANGENTIAL TILT

RADIAL TILT

TANGENTIAL TILT

PD42

RADIAL TILT

TANGENTIAL TILT

DEFOCUS

DETRACK

RADIAL TILT

TANGENTIAL TILT

ERROR SIGNAL DETECTION APPARATUS FOR AN OPTICAL RECORDING/REPRODUCTION SYSTEM

CROSS-REFERENCE TO RELATED APPLICATIONS

This application claims the benefit of Korean Application No. 2000-68501, filed Nov. 17, 2000, in the Korean Industrial Property Office, the disclosure of which is incorporated herein by reference.

BACKGROUND OF THE INVENTION

1. Field of the Invention

The present invention relates to an error signal detection apparatus for an optical recording/reproducing system, and more particularly, to an error signal detection apparatus for an optical recording/reproducing system, which can detect a tangential tilt error signal and/or a radial tilt error signal with respect to a relative tilt between an objective lens and a recording medium, and/or a defocus error signal, using a main light beam used for recording an information signal on or reproducing an information signal from the recording medium.

2. Description of the Related Art

Optical pickups record an information signal on or reproduce the information signal from a recording medium, such as an optical disc seated on a turntable and rotating, while scanning the recording medium in the radial direction. However, if the rotating optical disc is tilted with respect to the optical axis, due to bending of the optical disc itself or due to an error in loading the disc, degradation of a recording/reproduction signal could occur.

When an optical pickup adopts a light source, which emits a shorter wavelength of light and an objective lens having a high numerical aperture (NA) to increase recording density, comma aberration caused by a tilt of the optical disc increases, thereby further degrading the recording/reproduction signal. Comma aberration increases as the tilt of the optical disc increases because optical aberration is proportional to $\lambda/(NA)^3$.

In an optical recording/reproducing system for high-density recording and reproduction in a recording medium, such as a digital versatile disc (DVD) and/or next generation DVD series (so-called high definition (HD)-DVD), there is a need for a tilt error signal detection apparatus for correcting a record/reproduction signal according to a relative tilt between the recording medium and the objective lens.

To accurately detect a radial tilt error signal, there is a need for the tilt error signal detection apparatus in the optical recording/reproducing system to detect a radial tilt error signal without being influenced by a tangential tilt, a defocus, or a detrack. To accurately detect a tangential tilt error signal, there is a need for the tilt error signal detection apparatus for in the optical recording/reproduction system to detect a tangential tilt error signal without being affected by the radial tilt, the defocus, or the detrack.

On the other hand, as shown in FIG. 1, a light beam reflected by a recording medium 10, after being focused as a light spot on the recording medium 10, is diffracted into a 0th order diffracted beam and ±1st order diffracted beams by, for example, pits (P) formed on the recording medium 10. Thus, a photodetector 9 in the optical pickup to detect an information signal receives the 0th order diffracted beam and the ±1st order diffracted beams. For the 0th order diffracted beam and ±1st order diffracted beams received by the photodetector 9, the 0th order diffracted beam overlaps each of the ±1st order diffracted beams that do not overlap each other. Detection signals from the overlapping portions between the 0th order diffracted beam and each of the ±1st order diffracted beams, and a detection signal from a pure 0th order diffracted beam have different phase characteristics. That is, the phase characteristics of individual light beam portions reflected/diffracted by the recording medium 10 differ from one to another. The phase characteristics of the detection signals vary according to a degree of tangential and/or radial tilt.

In a conventional error signal detection apparatus for detecting a tangential or radial tilt, a light beam reflected by the recording medium 10 is received as four divided light beams by the photodetector 9, which is divided into four sections. The four divided light beams are photoelectrically converted, separately, and the detection signals from the four divided light beams are summed or subtracted to detect a tangential or radial tilt error signal. Thus, the original phase characteristic according to position in the light beam, which is reflected/diffracted from the recording medium 10, cannot be reflected sufficiently in detecting a tangential or radial tilt error signal. As a result, the tangential or radial tilt error signal cannot be accurately detected.

On the other hand, when defocus occurs in recording data in the next generation DVD series recording medium for high-density recording, a method for compensating for defocus is needed because the high-density recording medium is greatly affected by the defocus compared to a conventional recording medium, which uses a red laser beam. In other words, when a short-wavelength light source, for example, having a blue wavelength of 420 nm or less, and an objective lens having an NA of 0.6 or more are used for high-density recording, a defocus margin becomes smaller due to a small focus depth of an incident light beam. As a result, even if a small degree of defocus occurs in the recording data, the problem of the defocus can be serious for the high-density recording medium.

As well known, when recording is performed on the DVD series recording medium, defocus may be controlled with a variation of about 230 nm by using a 650-nm light beam and an objective lens having an NA of 0.6. However, when recording is performed on the next generation DVD series recording medium using a blue light and an objective lens having, for example, an NA of 0.85, there is a need to accurately control the defocus to be within the range of tens of nanometers.

To precisely control the defocus to be within the range of tens of nanometers for data recording on the next generation DVD series recording medium, there is a need to detect a defocus error signal without being affected by detrack, and a relative tangential and radial tilt between the objective lens and the recording medium.

SUMMARY OF THE INVENTION

Various objects and advantages of the invention will be set forth in part in the description that follows and, in part, will be obvious from the description, or may be learned by practice of the invention.

To solve the above and other problems, it is an object of the present invention to provide an error signal detection apparatus for an optical recording/reproducing system, which can accurately detect a tangential tilt error signal in consideration of phase characteristics of light beam portions reflected/diffracted from an information stream of a recording medium, without being affected by radial tilt, defocus, and detrack.

It is another object of the present invention to provide an error signal detection apparatus for an optical recording/reproducing system, which can accurately detect a radial tilt error signal in consideration of phase characteristics of light beam portions reflected/diffracted from an information stream of a recording medium, without being affected by tangential tilt, defocus, and detrack.

It is another object of the present invention to provide an error signal detection apparatus for an optical recording/reproducing system, which can accurately detect a defocus error signal in consideration of phase characteristics of light beam portions reflected/diffracted from an information stream of a recording medium, without being affected by tangential and radial tilt, and detrack.

To achieve these and other objects of the present invention, there is provided an error signal detection apparatus for an optical recording/reproducing system including a light source emitting a light beam and an objective lens focusing the light beam to form a light spot on a recording medium, the apparatus including: a photodetecting unit dividing at least a part of the light beam passed through the objective lens after being reflected/diffracted from an information stream of the recording medium into light beam portions, and detecting the light beam portions; and a signal processor detecting phase differences between detection signals from the light beam portions to detect a tangential error signal.

The photodetecting unit divides the light beam into first, second, third, and fourth light beam portions in a direction corresponding to a radial direction of the recording medium, and detects and outputs first, second, fourth, and third detection signals from the first, second, third, and fourth light beam portions, and the signal processor detects and outputs the tangential tilt error signal as a sum of a phase difference between the first and second detection signals and a phase difference between the third and fourth detection signals.

The photodetecting unit divides a part of the light beam with respect to an axis crossing an optical axis parallel to a tangential direction of the recording medium, and detects therefrom first, second, third, and fourth light beam portions in directions corresponding to the radial and tangential directions of the recording medium, where the first, second, third, and fourth light beam portions are arranged in order, counterclockwise or clockwise in a 2×2 matrix and where a row and a column of the matrix are parallel to directions corresponding to the radial and tangential directions of the recording medium, respectively, and the signal processor detects and outputs the tangential tilt error signal as a sum of a phase difference between the first and second detection signals corresponding to the first and third light beam portions, respectively, and a phase difference between third and fourth detection signals corresponding to the second and fourth light beam portions, respectively.

To achieve another object of the present invention, there is provided an error signal detection apparatus for an optical recording/reproducing system including a light source emitting a light beam and an objective lens focusing the light beam to form a light spot on a recording medium, the apparatus including: a photodetecting unit dividing at least a part of the light beam passed through the objective lens after being reflected/diffracted from an information stream of the recording medium into light beam portions, and detecting the light beam portions; and a signal processor detecting phase differences between detection signals from the light beam portions to detect a defocus error signal.

The photodetecting unit divides the light beam and detects therefrom first, second, third, and fourth inner portions arranged counterclockwise or clockwise in directions corresponding to radial and tangential directions of the recording medium, and into first, second, third, and fourth outer portions which are outward from the first, second, third, and fourth inner portions in a direction corresponding to the tangential direction of the recording medium, wherein the first, second, third, and fourth outer and inner portions are arranged in a 4×2 matrix, where a row and a column of the matrix are parallel to directions corresponding to the radial and tangential directions of the recording medium, and the first inner and outer portions are arranged in a column different from the fourth inner and outer portions, and where a sum of the detection signals from the first outer portion and the fourth inner portion is a first detection signal, a sum of the detection signals from the fourth outer portion and the first inner portion is a second detection signal, a sum of the detection signals from the second inner portion and the third outer portion is a third detection signal, and a sum of the detection signals from the third inner portion and the second outer portion is a fourth detection signal, and the signal processor detects the radial tilt error signal as a sum of a phase difference between the first and second detection signals, and a phase difference between the third and fourth detection signals.

The above and other object of the present invention are also achieved by an error signal detection apparatus for an optical recording/reproducing system including a light source emitting a light beam and an objective lens focusing the light beam to form a light spot on a recording medium, the apparatus including: a photodetecting unit dividing at least a part of the light beam passed through the objective lens after being reflected/diffracted from an information stream of the recording medium into light beam portions, and detecting the light beam portions; and a signal processor detecting phase differences between detection signals from the light beam portions to detect a radial tilt error signal.

In one embodiment of the error signal detection apparatus, the first, second, third, and fourth outer light beam portions form a 2×2 matrix, wherein a row and a column of the matrix are parallel to directions corresponding to the radial and tangential directions of the recording medium, and the first and fourth outer light beam portions are in different columns; and the signal processor receives first, second, third, and fourth outer light beam portions and processes therefrom the first, second, fourth, and third detection signals. In this case, it is preferable that, when the light beam is divided into a first outer portion, an intermediate light beam portion, and a second outer portion in a direction corresponding to the radial direction, the photodetecting unit divides the first and second outer portions of the light beam into first through fourth light beam portions, and detects the first through fourth light beam portions. Further, the light beam is divided into a first outer portion, an intermediate portion, and a second outer portion in a direction corresponding to the radial direction of the recording medium, the photodetecting unit divides the intermediate portion of the light beam and detects therefrom first, second, third, and fourth light beam portions. The photodetecting unit divides the light beam and detects therefrom the first through fourth light beam portions.

In another embodiment of the error signal detection apparatus, the photodetecting unit divides the light beam into a first outer portion, an intermediate portion, and a second outer portion in a direction corresponding to a tangential direction of the recording medium, and divides the first and second outer portions and detects therefrom first, second, third, and fourth outer light beam portions in the direction corresponding to the tangential direction of the recording medium, and arranged counterclockwise or clockwise in order, and/or divides the intermediate portion and detects therefrom first, second, third, and fourth inner light beam portions in directions corresponding to a radial direction and the tangential direction of the recording medium, where the first, second, third, and fourth outer light beam portions are arranged counterclockwise or clockwise, in order. The signal processor detects the defocus error signal as a sum of a phase difference between a first detection signal from the first outer light beam portion and/or the second inner light beam portion and a second detection signal from the second outer light beam portion and/or the first inner light beam portion, and a phase difference between a third detection signal from the third inner light beam portion and/or the fourth outer light beam portion and a fourth detection signal from the third outer light beam portion and/or the fourth inner light beam portion.

In this case, the first, second, third, and fourth outer light beam portions form a 2×2 matrix, wherein a row and a column of the matrix are parallel to directions corresponding to the radial and tangential directions of the recording medium, and the first and fourth outer light beam portions are in different columns; and the signal processor receives first, second, third, and fourth outer light beam portions and processes therefrom the first, second, fourth, and third detection signals.

The first, second, third, and fourth inner light beam portions form a 2×2 matrix, wherein a row and a column of the matrix are parallel to directions corresponding to the radial and tangential directions of the recording medium, and the first and fourth inner light beam portions are in different columns; and the signal processor receives first, second, third, and fourth inner light beam portions and processes therefrom the first, second, fourth, and third detection signals.

The photodetecting unit divides the first and second outer portions of the light beam and detects therefrom the first, second, third, and fourth outer light beam portions arranged counterclockwise or clockwise, in order, parallel to a direction corresponding to the tangential direction of the recording medium, and divides the intermediate portion and detects therefrom the first, second, third, and fourth inner light beam portions arranged counterclockwise or clockwise, in order, parallel to directions corresponding to the radial and tangential directions of the recording medium, wherein the first, second, third, and fourth outer and inner portions are arranged in a 4×2 matrix, where a row and a column of the matrix are parallel to directions corresponding to the radial and tangential directions of the recording medium, and the first and second outer portions are located in different columns, and the signal processor outputs the sum of the phase difference between the first detection signal, which is a sum of the detection signals from the first outer light beam portion and the second inner light beam portion, and the second detection signal, which is a sum of the detection signals from the second outer light beam portion and the first inner light beam portion, and the phase difference between the third detection signal, which is a sum of detection signals from the third inner light beam portion and the fourth outer light beam portion, and the fourth detection signal, which is a sum of the detection signals from the third outer light beam portion and the fourth inner light beam portion.

In still another embodiment of the error signal detection apparatus, the photodetecting unit divides the light beam into first, second, third, and fourth light beam portions in a direction corresponding to a tangential direction of the recording medium, and detects and outputs first, second, fourth, and third detection signals from the first, second, third, and fourth light beam portions, and the signal processor detects and outputs the defocus error signal as a sum of a phase difference between the first and second detection signals and a phase difference between the third and fourth detection signals.

An error signal detection apparatus for an optical recording/reproducing system including a light source emitting a light beam and an objective lens focusing the light beam to form a light spot on a recording medium, the apparatus including: a photodetecting unit dividing at least a part of the light beam passed through the objective lens after being reflected/diffracted from an information stream of the recording medium into light beam portions and detecting the light beam portions; and a signal processor detecting phase differences between detection signals from the light beam portions to simultaneously detect two or more error signals, wherein the error signals include a tangential error signal, a defocus error signal, and a radial tilt error signal.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE INVENTION

Figure 1:
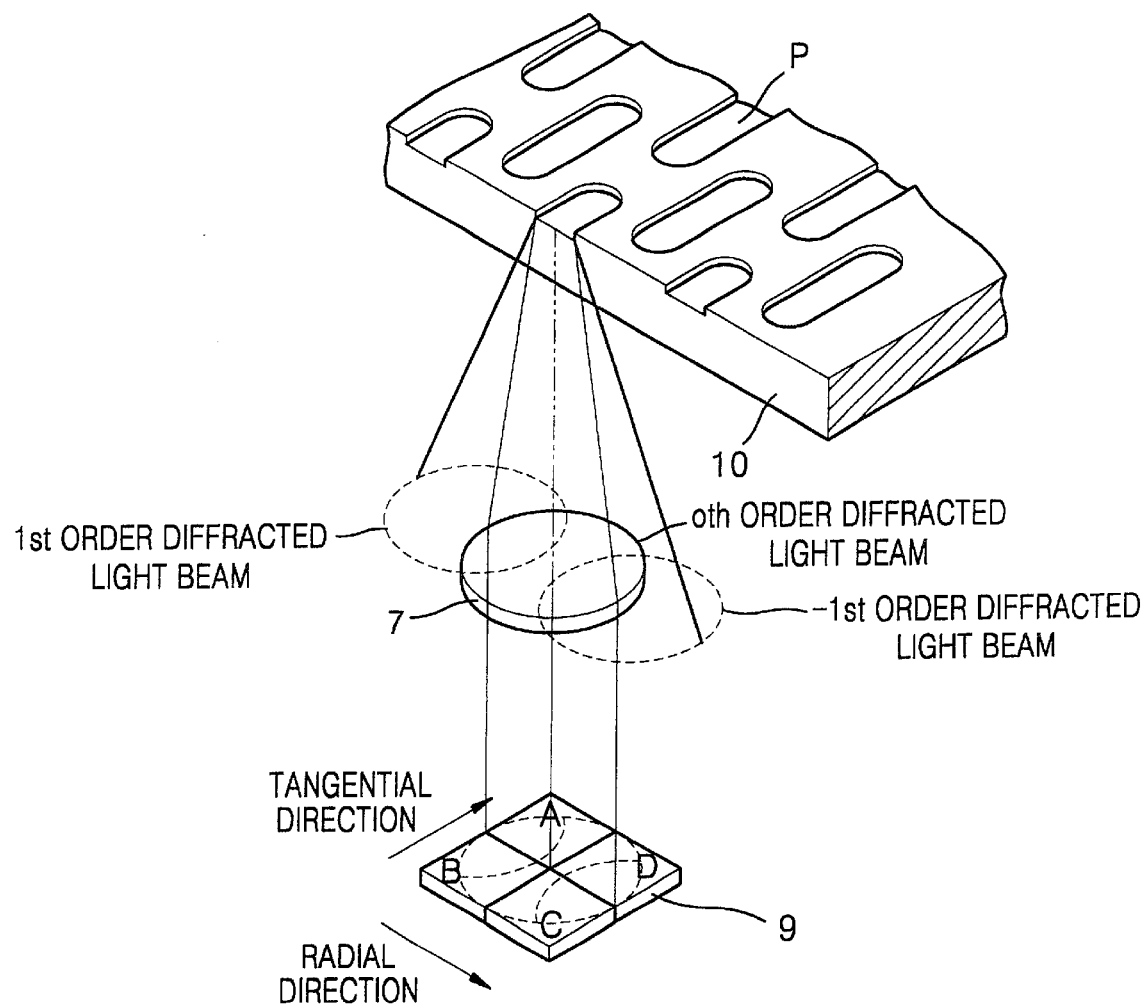
FIG. 1 illustrates a light beam reflected and diffracted from a recording medium.
Figure 2:
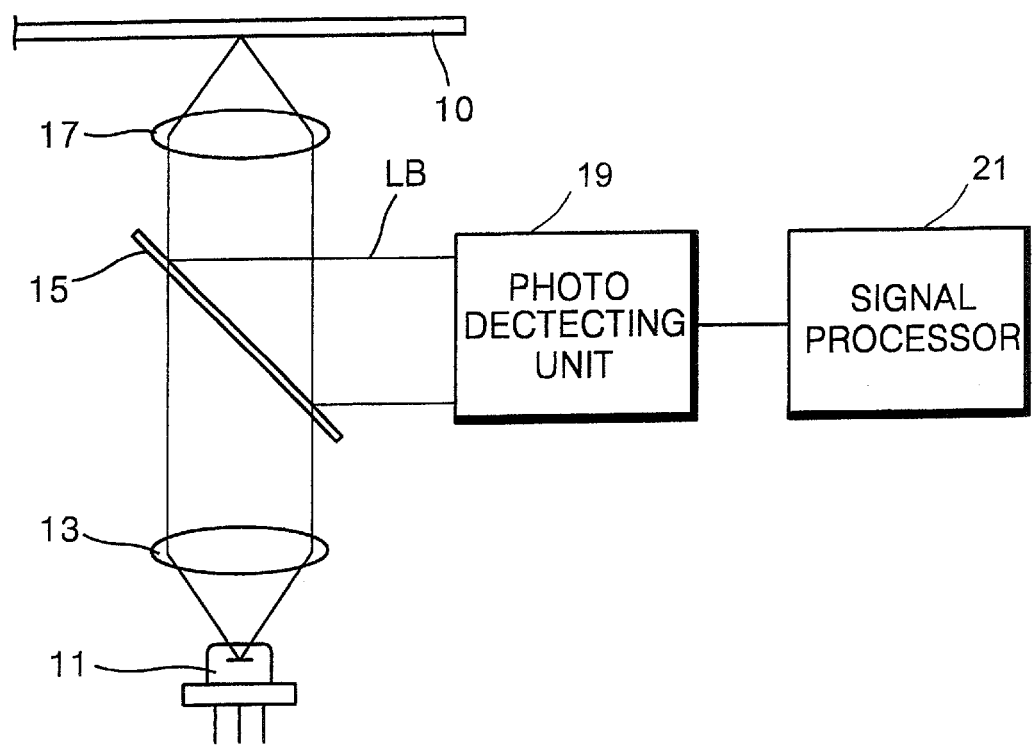
FIG. 2 illustrates an example of an optical pickup adopting an error signal detection apparatus for an optical recording/reproducing system according to the present invention.

Referring to FIG. 2, an exemplary embodiment of an error signal detection apparatus for an optical recording/reproducing system, according to the present invention, receives a light beam LB, passed through an objective lens 17 and an optical path changer 15, after being reflected/diffracted from an information stream of a recording medium. The error detection apparatus detects a tangential tilt error signal, a radial tilt error signal, and/or a defocus error signal from the received light beam LB. The objective lens 17 focuses the light beam to form a light spot on a recording surface of the recording medium. The error signal detection apparatus further includes a light source 11 and a collimating lens 13 disposed between the optical path changer 15 and the light source 11, collimating an incident diverging light beam from the light source 11 transmitted or reflected by the optical path changer 15.

The error signal detection apparatus for the optical recording/reproducing system according to the present invention includes a photodetecting unit 19 for dividing at least part of the light beam LB passed through the objective lens 17, after being reflected/diffracted from the information stream of the recording medium into a plurality of light beam portions, and detecting signals from the divided light beam portions. A signal processor 21 detects phase differences between the signals detected from the plurality of light beam portions to detect a tangential tilt, a radial tilt, and/or a defocus error signal.

Figure 3:
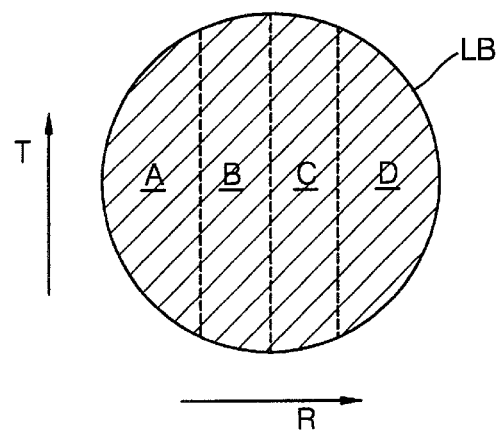
FIG. 3 illustrates a first through fourth light beam portions A, B, C, and D of a light beam incident on a recording medium.
Figure 4:
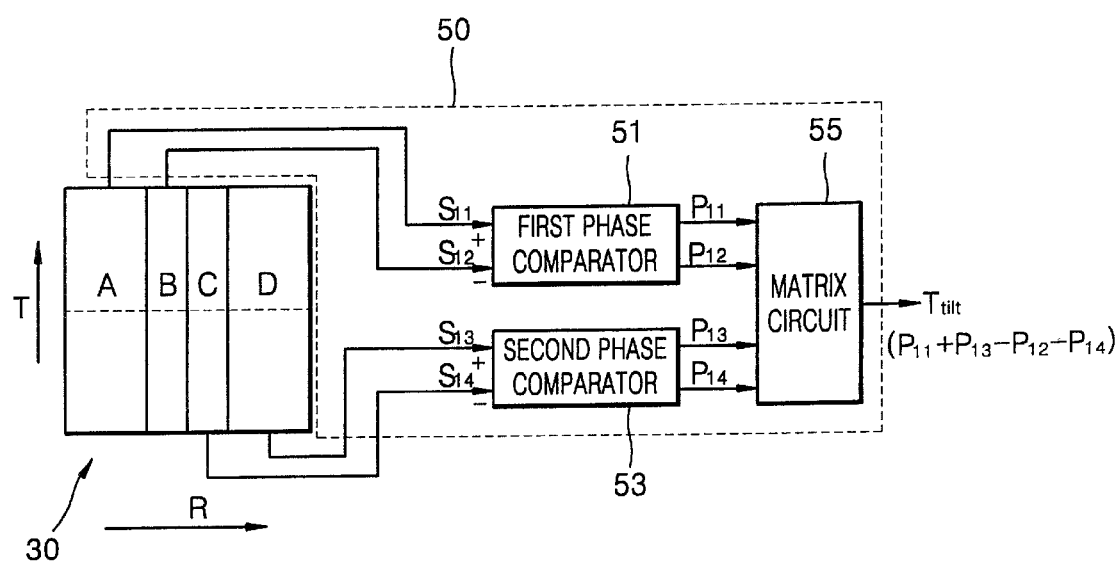
FIG. 4 illustrates a first embodiment of an error signal detection apparatus for the optical recording/reproducing system according to the present invention.

Referring to FIG. 3, in a first embodiment of an error signal detection apparatus for an optical recording/reproducing system according to the present invention, the photodetecting unit 19 divides the light beam LB passed through the objective lens 17, after being reflected/diffracted from the information stream of the recording medium 10, into first thought fourth light beam portions A, B, C, and D in a direction (R direction) corresponding to the radial direction of the recording medium 10. The photodetecting unit 19 detects and outputs first, second, fourth, and third detection signals $S_{11}$, $S_{12}$, $S_{14}$, and $S_{13}$. As shown in FIG. 4, a signal processor 50 adds a phase difference between the first and second detection signals S11 and S12, and a phase difference between the third and fourth detection signals S13 and S14, and outputs an added result. The error signal detection apparatus generates a tangential tilt error signal indicative of the added result.

For example, the photodetecting unit 19 of the first embodiment of the error signal detection apparatus, according to the present invention, may include a photodetector 30 having first through fourth light receiving sections A, B, C, and D, as shown in FIG. 4, which are divided in an R direction, for dividing the light beam LB into first through fourth light beam portions A, B, C, and D, and separately and photoelectrically converting the first through fourth light beam portions A, B, C, and D. For purposes of brevity, in the present and following embodiments, the light beam portions of the light beam LB, and the light beam receiving sections of the photodetector receiving the light beam portions are represented by the same reference numerals.

The first through fourth light beam receiving sections A, B, C, and D are long in a direction (T direction) corresponding to a tangential direction of the recording medium 10 with narrow widths in the R direction. The first through fourth light beam receiving sections A, B, C, and D of the photodetector separately and photoelectrically convert the first through fourth light beam portions A, B, C, and D of the light beam LB incident after being reflected/diffracted from the recording medium 10, into first, second, fourth, and third detection signals $S_{11}$, $S_{12}$, $S_{14}$, and $S_{13}$.

In an exemplary embodiment, the photodetector 30 has eight light beam receiving sections obtained by dividing the first through fourth light beam receiving sections A, B, C, and D into two in the T direction along a dashed line shown in FIG. 4.

In the present and following embodiments, the light beam LB incident on the photodetecting unit 19 is a main light beam used to record information on the recording medium 10, or reproduce information from the recording medium 10. In the present embodiment and following embodiments, the photodetector used as the photodetecting unit 19 is formed as a 2×4 or 4×2 matrix having eight sections, or at least as a 2×2 matrix having four sections, such that the photodetector can detect the information signal recorded on the recording medium 10 and detect error signals.

For example, the signal processor 50 may include a first phase comparator 51 receiving the first and second detection signals $S_{11}$ and $S_{12}$ and comparing phases of the first and second detection signals $S_{11}$ and $S_{12}$, and a second phase comparator 53 receiving the third and fourth detection signals $S_{13}$ and $S_{14}$ and comparing phases of the third and fourth detection signals $S_{13}$ and $S_{14}$. The signal processor 50 further includes a matrix circuit 55 processing the phase comparison signals from the first and second phase comparators 53.

The first phase comparator 51 outputs a first phase comparison signal $P_{11}$ if a phase of the first detection signal $S_{11}$ leads a phase of the second detection signal $S_{12}$, and a second phase comparison signal $P_{12}$ if the phase of the second detection signal $S_{12}$ leads the phase of the first detection signal $S_{11}$. In a similar manner, the second phase comparator 53 outputs a third phase comparison signal $P_{13}$ if a phase of the third detection signal $S_{13}$ leads a phase of the fourth detection signal $S_{14}$, and a fourth phase comparison signal $P_{14}$ if the phase of the fourth detection signal $S_{14}$ leads the phase of the third detection signal $S_{13}$. The matrix circuit 55 receives the first through fourth phase comparison signals $P_{11}$, $P_{12}$, $P_{13}$, and $P_{14}$, and outputs a differential signal between a sum of the second and fourth phase comparison signals $P_{12}$ and $P_{14}$, and a sum of the first and third phase comparison signals $P_{11}$ and $P_{13}$, as a tangential tilt error signal $T_{tilt}$ (=$P_{11}$+$P_{13}$−$P_{12}$−$P_{14}$).

FIGS. 5A through 5D are graphs illustrating the tangential tilt error signal $T_{tilt}$ from the first embodiment of the error signal detection apparatus according to the present invention. In the graphs illustrating the output characteristics of the error signal detection apparatuses according to the present and following embodiments of the present invention, for illustrative purposes, a light source having a wavelength (λ) of 400 nm, an objective lens having an NA of 0.65, and a next generation DVD-ROM disc having a track pitch of 0.37 μm are used.

Figure 5A:
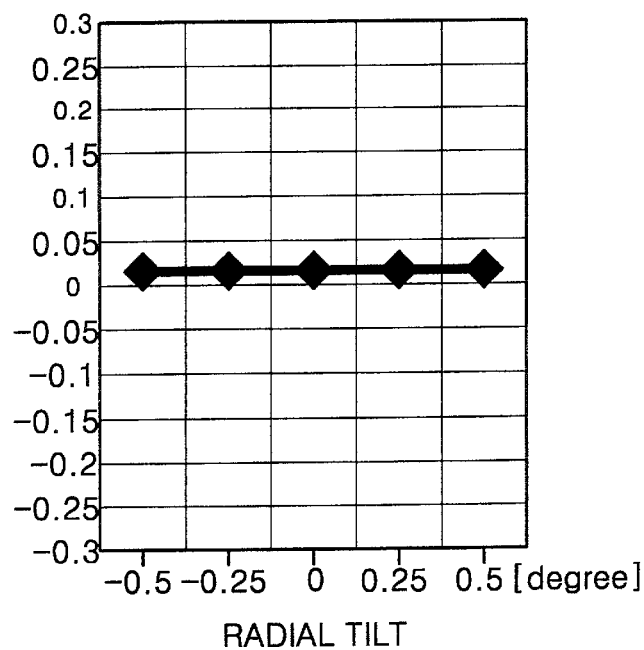
FIG. 5A is a graph illustrating a tangential tilt error signal $T_{tilt}$ output from the error signal detection apparatus of FIG. 4, when a radial tilt occurs.
Figure 5B:
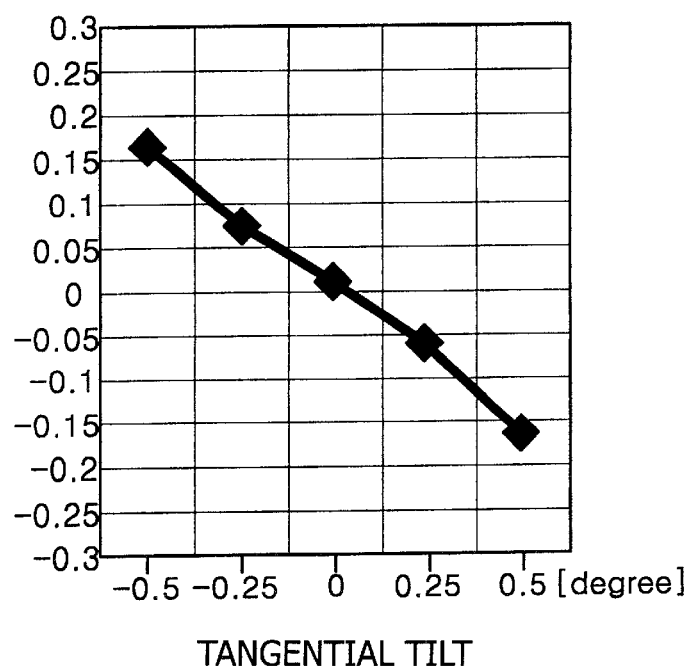
FIG. 5B is a graph illustrating the tangential tilt error signal $T_{tilt}$ output from the error signal detection apparatus of FIG. 4, when a tangential tilt occurs.
Figure 5C:
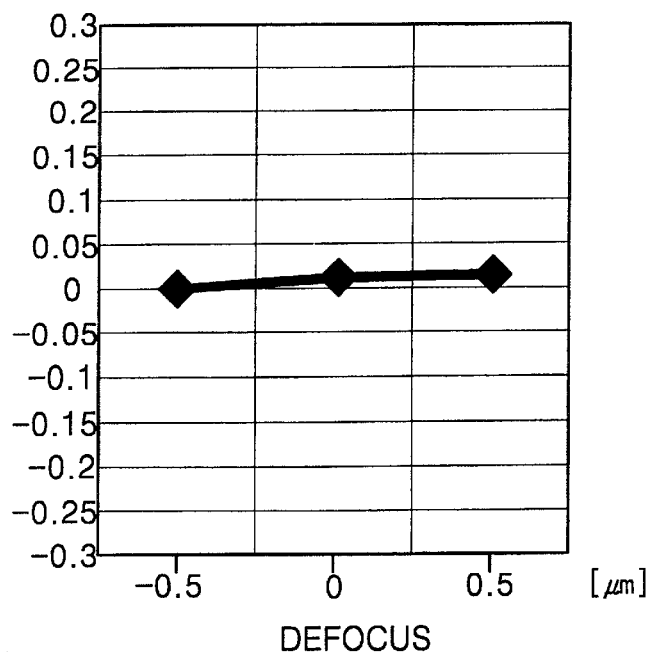
FIG. 5C is a graph illustrating the tangential tilt error signal $T_{tilt}$ output from the error signal detection apparatus of FIG. 4, when a defocus occurs.
Figure 5D:
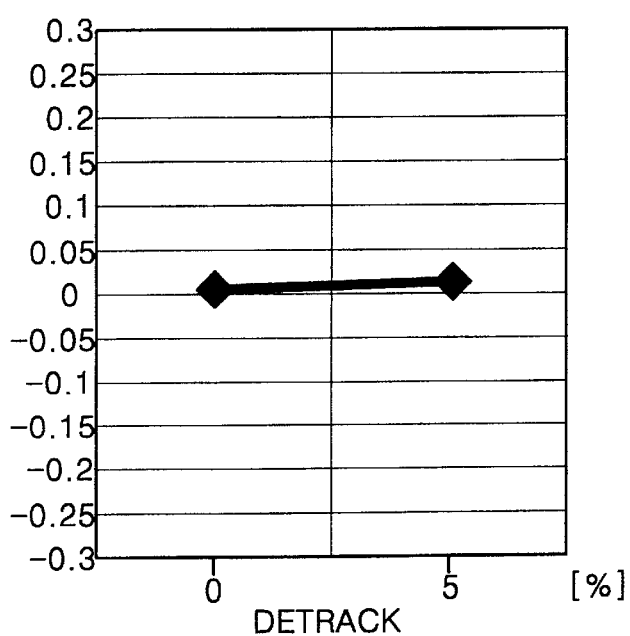
FIG. 5D is a graph illustrating the tangential tilt error signal $T_{tilt}$ output from the error signal detection apparatus of FIG. 4, when a detrack occurs.

FIG. 5A is a graph illustrating a tangential tilt error signal $T_{tilt}$ output from the error signal detection apparatus of FIG. 4, when a radial tilt occurs. FIG. 5B is a graph illustrating the tangential tilt error signal $T_{tilt}$ output from the error signal detection apparatus of FIG. 4, when a tangential tilt occurs. FIG. 5C is a graph illustrating the tangential tilt error signal $T_{tilt}$ output from the error signal detection apparatus of FIG. 4, when a defocus occurs. FIG. 5D is a graph illustrating the tangential tilt error signal $T_{tilt}$ output from the error signal detection apparatus of FIG. 4, when a detrack occurs. In FIG. 5D, the degree of detrack in the horizontal axis is represented by a percentage with respect to the track pitch of the recording medium.

As shown in FIGS. 5A, 5C, and 5D, the signal $T_{tilt}$ detected by the error signal detection apparatus, according to the first embodiment of the present invention, is almost unaffected by the radial tilt, the defocus, and the detrack, and is greatly affected by only the tangential tilt, as shown in FIG. 5B.

Thus, the tangential tilt error signal can be accurately detected without being affected by the radial tilt, the defocus, and the detrack, using the error signal detection apparatus according to the first embodiment of the present invention.

Figure 6:
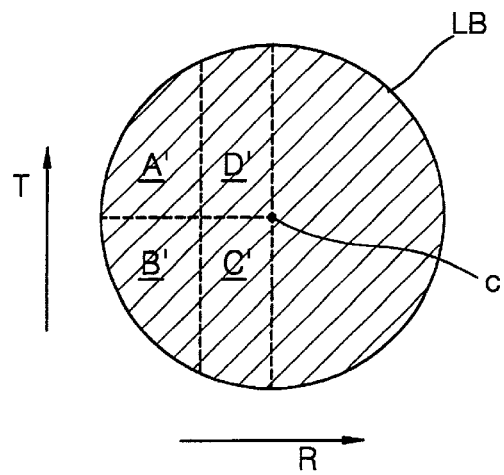
FIG. 6 illustrates a first through fourth light beam portions A', B', C', and D' of the light beam incident on the recording medium.
Figure 7:
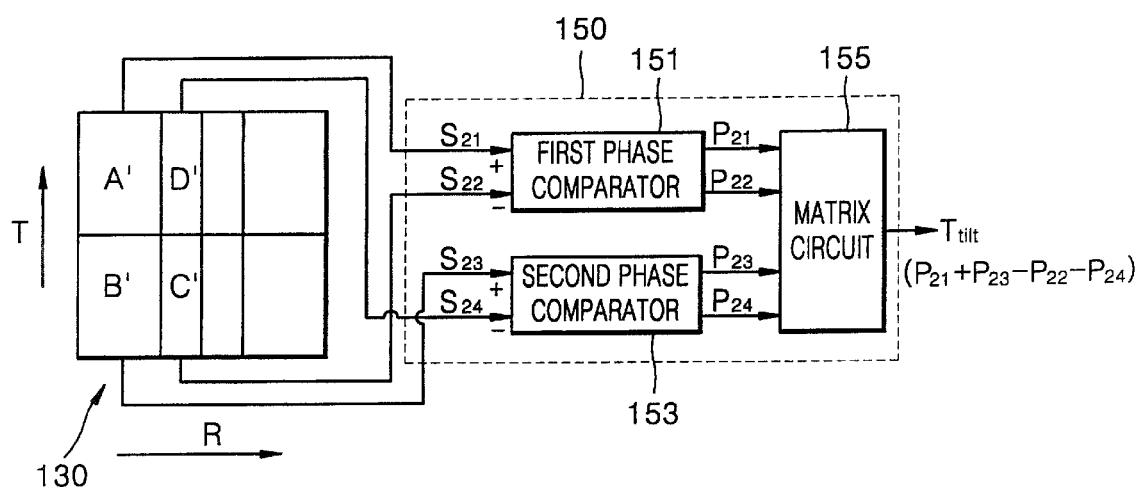
FIG. 7 illustrates a second embodiment of the error signal detection apparatus for the optical recording/reproducing system according to the present invention.

Referring to FIGS. 6 and 7, a second embodiment of the error signal detection apparatus according to the present invention includes the photodetecting unit 19 and a signal processor 150. The photodetecting unit 19 divides a part of the light beam LB passed through the objective lens 17, after being reflected/diffracted from the information stream of the recording medium 10, which corresponds to a half of the light beam, i.e., a semicircular portion if the light beam LB is circular, with respect to an axis crossing the optical axis c parallel to the T direction. The part of the light beam LB is divided into first through fourth light beam portions A', B', C', and D' along each of the T and R directions. The photodetecting unit 140 detects first, third, second, and fourth detection signals $S_{21}$, $S_{23}$, $S_{22}$, and $S_{24}$ from the first through fourth light beam portions A', B', C', and D', respectively, and outputs the first, third, second, and fourth detection signals $S_{21}$, $S_{23}$, $S_{22}$, and $S_{24}$. The signal processor 150 outputs a sum signal indicative of a phase difference between the first and second detection signal $S_{21}$ and $S_{22}$, and a phase difference between the third and fourth detection signals $S_{23}$ and $S_{24}$.

The first through fourth light beam portions A', B', C', and D' are formed as a 2×2 matrix and are arranged counter-clockwise in order, where row and column of the matrix are parallel to the R and T directions of the recording medium, respectively. For illustrative purposes, the first light beam portion A' is located in a first row and first column. Alternatively, the first light beam portion A' may be located in a second row and second column.

FIG. 7 shows an example in which the photodetecting unit 19 of the error signal detection apparatus, according to the second embodiment of the present invention, includes a photodetector 130 formed as a 2×4 matrix including eight sections. An error signal is detected using phase comparison signals received from the first through fourth light beam receiving sections A', B', C', and D', which receive the first through fourth light beam portions A', B', C', and D', respectively. Here, the row and column of the matrix are parallel to the R and T directions of the recording medium, respectively.

The signal processor 150 includes a first phase comparator 151 receiving the first and second detection signals $S_{21}$ and $S_{22}$, a second phase comparator 153 receiving the third and fourth detection signals $S_{23}$ and $S_{24}$, and a matrix circuit 155. In the present and following embodiments, the structures of the first and second phase comparators 150, 151 and the matrix circuit 155, which process first through fourth phase comparison signals $P_{21}$, $P_{22}$, $P_{23}$, and $P_{24}$ are substantially the same as those of the first embodiment described with reference to FIG. 4, and thus descriptions of the signal processing by the first and second phase comparators 150, 151 will not be provided in the present and following embodiments.

The matrix circuit 155 receives the first and second phase comparison signals $P_{21}$ and $P_{22}$ from the first phase comparator 151, and the third and fourth phase comparison signals $P_{23}$ and $P_{24}$ from the second phase comparator 153, and outputs a differential signal between the sum of the first and third phase comparison signals $P_{21}$ and $P_{23}$, and the sum of the second and fourth phase comparison signals $P_{22}$ and $P_{24}$, as the tangential tilt error signal $T_{tilt}$ (=$P_{21}+P_{23}-P_{22}-P_{24}$).

Figure 8A:
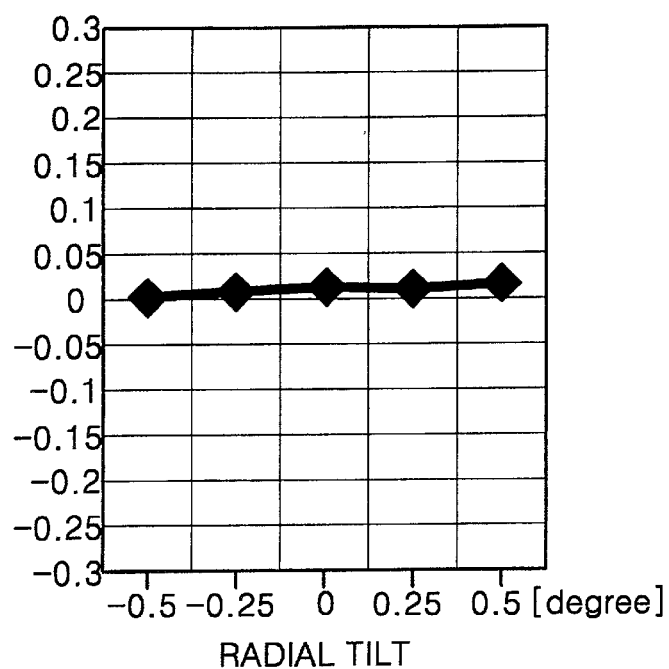
FIG. 8A is a graph illustrating the tangential tilt error signal $T_{tilt}$ output from the error signal detection apparatus of FIG. 7, when a radial tilt occurs.
Figure 8B:
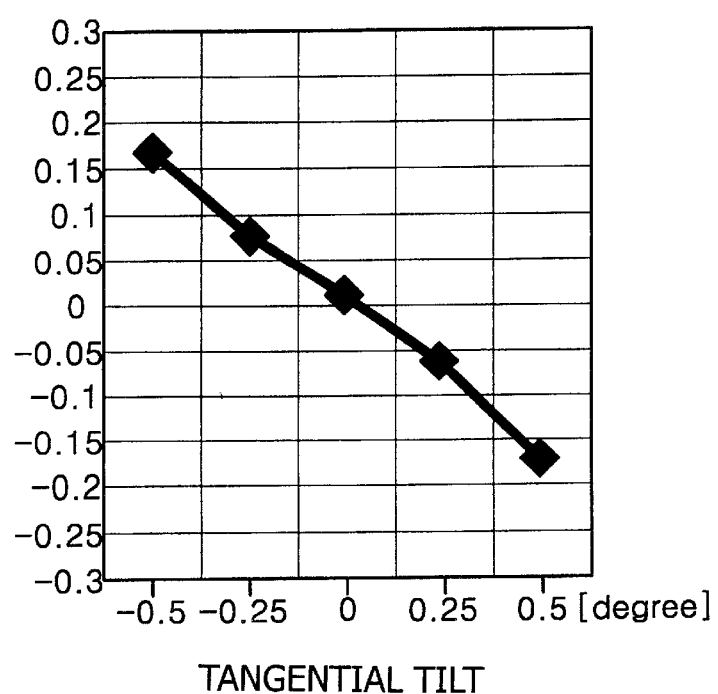
FIG. 8B is a graph illustrating the tangential tilt error signal $T_{tilt}$ output from the error signal detection apparatus of FIG. 7, when a tangential tilt occurs.
Figure 8C:
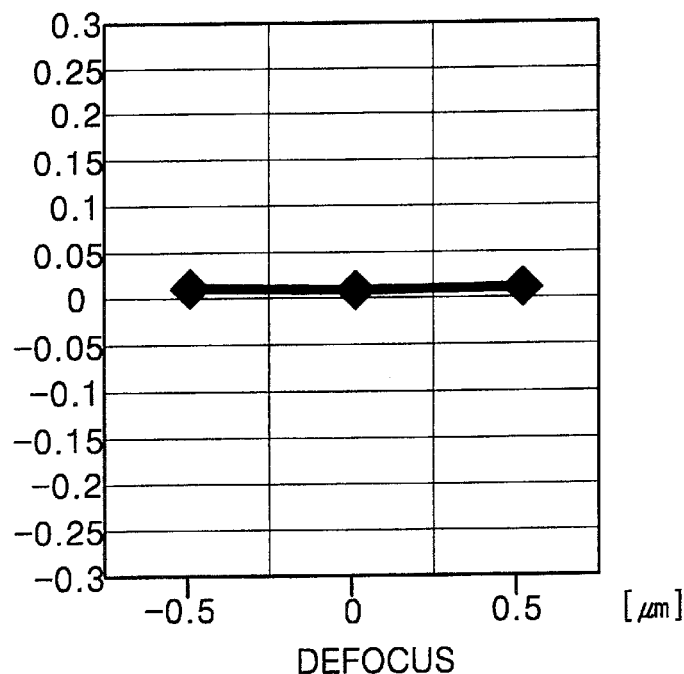
FIG. 8C is a graph illustrating the tangential tilt error signal $T_{tilt}$ output from the error signal detection apparatus of FIG. 7, when a defocus occurs.
Figure 8D:
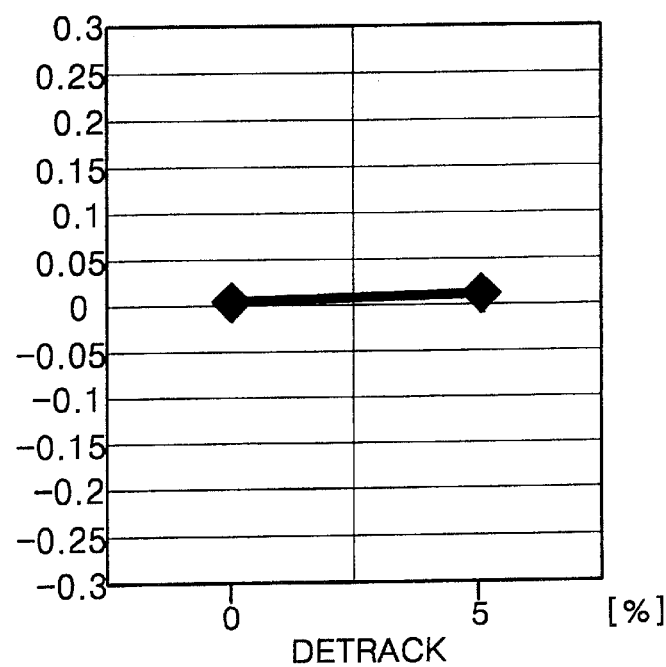
FIG. 8D is a graph illustrating the tangential tilt error signal $T_{tilt}$ output from the error signal detection apparatus of FIG. 7, when a detrack occurs.

FIGS. 8A through 8D are graphs illustrating the tangential tilt error signal $T_{tilt}$ output from the second embodiment of the error signal detection apparatus according to the present invention, when a radial tilt, tangential tilt, defocus, and detrack occur, respectively. As shown in FIGS. 8A, 8C, and 8D, like the error signal detection apparatus according to the first embodiment of the present invention, the signal $T_{tilt}$ detected by the error signal detection apparatus according to the second embodiment of the present invention is almost unaffected by the radial tilt, the defocus, and the detrack, as, but is greatly affected by the tangential tilt, as shown in FIG. 8B.

Thus, a tangential error signal can be accurately detected without being affected by the radial tilt, defocus, and detrack, using the error signal detection apparatuses according to the first and second embodiments of the present invention, having the above structures.

Figure 9:
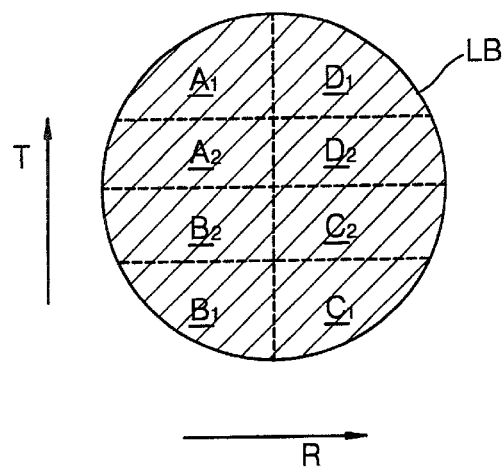
FIG. 9 illustrates a first through fourth light beam outer portions $A_1$, $B_1$, $C_1$, and $D_1$, and a first through fourth light beam inner portions $A_2$, $B_2$, $C_2$, and $D_2$ of the light beam incident on the recording medium.
Figure 10:
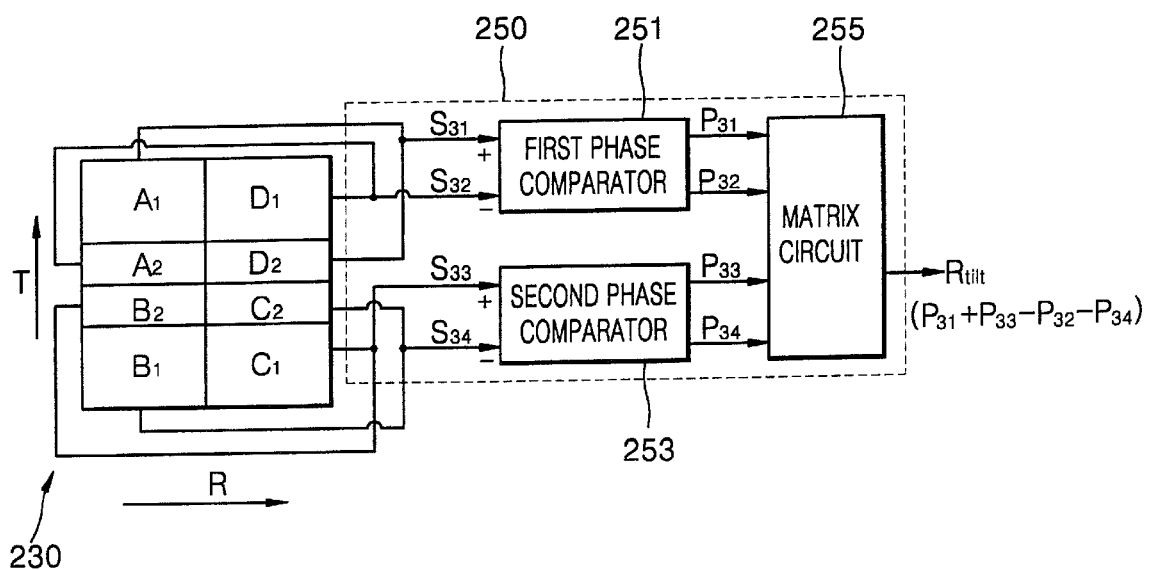
FIG. 10 illustrates a third embodiment of the error signal detection apparatus for the optical recording/reproducing system according to the present invention.

Referring to FIGS. 9 and 10, a third embodiment of the error signal detection apparatus according to the present invention includes the photodetecting unit 19 and a signal processor 250 to detect a radial tilt error signal. The photodetecting unit 19 divides the light beam LB passed through the objective lens 17, after being reflected/diffracted from the information stream of the recording medium 10, into first through fourth inner light beam portions $A_2$, $B_2$, $C_2$, and $D_2$ along each of the R and T directions, and first through fourth outer light beam portions $A_1$, $B_1$, $C_1$, and $D_1$. The photodetecting unit 19 detects divided light beam portions from each outer and inner light beam portions $A_1$, $B_1$, $C_1$, $D_1$, $A_2$, $B_2$, $C_2$, and $D_2$, where the first through fourth inner light beam portions $A_2$, $B_2$, $C_2$, and $D_2$ are arranged counter-clockwise in order, and the first through fourth outer light beam portions $A_1$, $B_1$, $C_1$, and $D_1$ are arranged outward of the first through fourth inner light beam portions $A_2$, $B_2$, $C_2$, and $D_2$, respectively, in the T direction. The signal processor 250 outputs a sum signal of a phase difference between first and second detection signals $S_{31}$ and $S_{32}$, and a phase difference between third and fourth detection signals $S_{33}$ and $S_{34}$.

The first through fourth inner light beam portions $A_2$, $B_2$, $C_2$, and $D_2$, and the first through fourth outer light beam portions $A_1$, $B_1$, $C_1$, and $D_1$ are formed as a 4×2 matrix, where the row and column of the matrix are parallel to the R and T directions, respectively. For illustrative purposes, the first outer light beam portion $A_1$ is located in the first row and first column. Alternatively, the first outer light beam portion $A_1$ may be located in the fourth row and second column.

As shown in FIG. 10, the photodetecting unit 19 of the error signal detection apparatus according to the third embodiment of the present invention may include a photodetector 230 formed as a 4×2 matrix having eight sections. Here, the row and column of the matrix are parallel to the R and T directions of the recording medium, respectively. The photodetector 230 includes first through fourth inner light beam receiving sections $A_2$, $B_2$, $C_2$, and $D_2$ to detect the first through fourth inner light beam portions $A_2$, $B_2$, $C_2$, and $D_2$, respectively. The photodector 230 also includes first through fourth outer light beam receiving sections $A_1$, $B_1$, $C_1$, and $D_1$ to detect the first through fourth outer light beam portions $A_1$, $B_1$, $C_1$, and $D_1$, respectively.

The first detection signal $S_{31}$ is a sum of detection signals from the first outer light beam portion $A_1$ and the fourth inner light beam portion $D_2$. The second detection signal $S_{32}$ is a sum of detection signals from the fourth outer light beam portion $D_1$ and the first inner light beam portion $A_2$. The third detection signal $S_{33}$ is a sum of detection signals from the second inner light beam portion $B_2$ and the third outer light beam portion $C_1$. The fourth detection signal $S_{34}$ is a sum of detection signals from the third inner light beam portion $C_2$ and the second outer light beam portion $B_1$.

The signal processor 250 includes a first phase comparator 251 receiving the first and second detection signals $S_{31}$ and $S_{32}$, a second phase comparator 253 receiving the third and fourth detection signals $S_{33}$ and $S_{34}$, and a matrix circuit 255. The matrix circuit 255 receives first and second phase comparison signals $P_{31}$ and $P_{32}$ from the first phase comparator 251, and third and fourth phase comparison signals $P_{33}$ and $P_{34}$ output from the second phase comparator 253, and outputs a differential signal between the sum of the first and third phase comparison signals $P_{31}$ and $P_{33}$, and the sum of the second and fourth phase comparison signals $P_{32}$ and $P_{34}$, as a radial tilt error signal $R_{tilt}$ $(=P_{31}+P_{33}-P_{32}-P_{34})$.

Figure 11A:
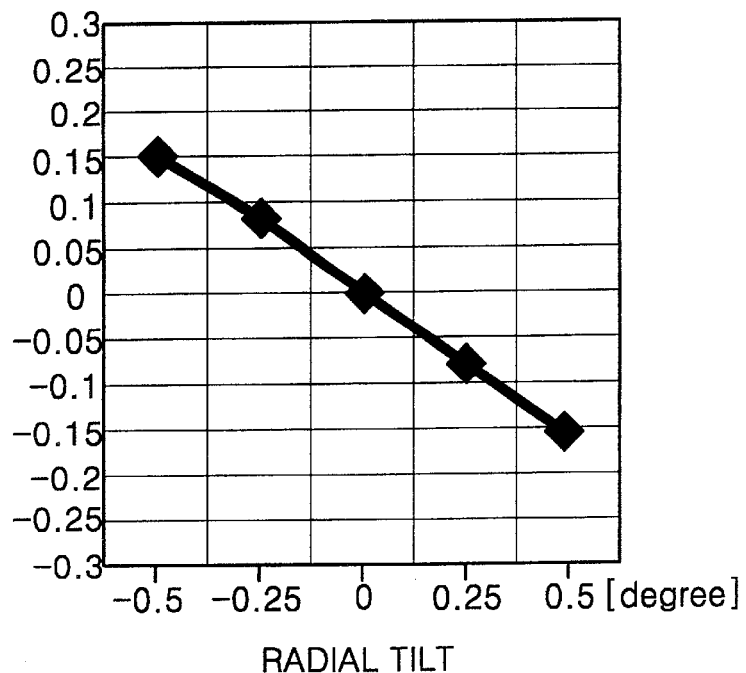
FIG. 11A is a graph illustrating a radial tilt error signal $R_{tilt}$ output from the error signal detection apparatus of FIG. 10, when a radial tilt occurs.
Figure 11B:
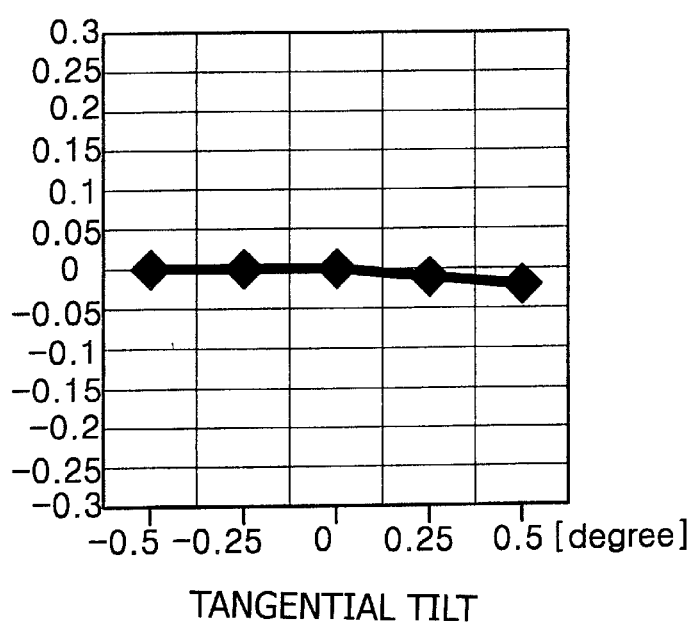
FIG. 11B is a graph illustrating the radial tilt error signal $R_{tilt}$ output from the error signal detection apparatus of FIG. 10, when a tangential tilt occurs.
Figure 11C:
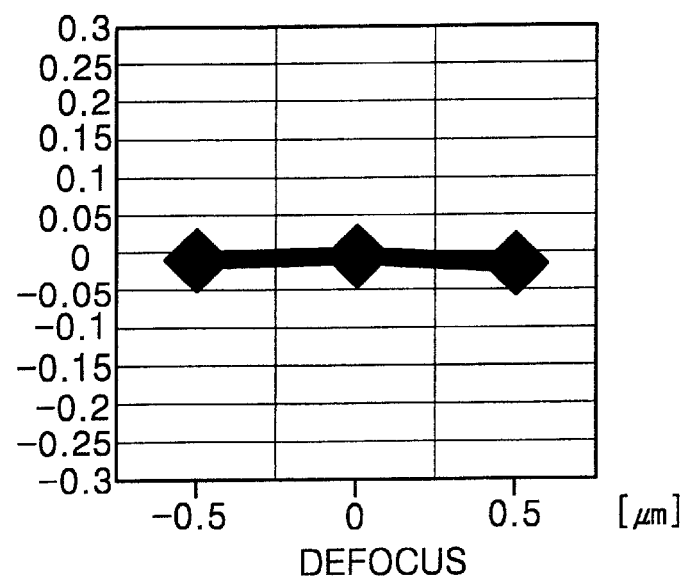
FIG. 11C is a graph illustrating the radial tilt error signal $R_{tilt}$ output from the error signal detection apparatus of FIG. 10, when a defocus occurs.
Figure 11D:
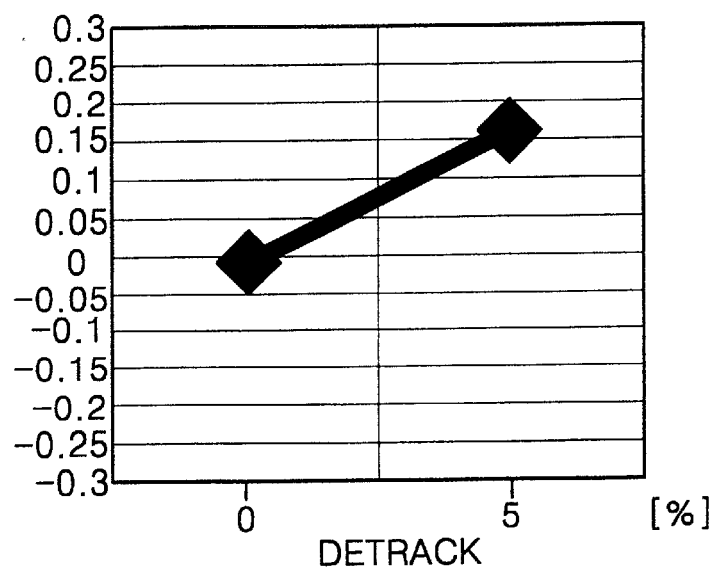
FIG. 11D is a graph illustrating the radial tilt error signal $R_{tilt}$ output from the error signal detection apparatus of FIG. 10, when a detrack occurs.

FIGS. 11A through 11D are graphs illustrating the radial tilt error signal $R_{tilt}$ output from the third embodiment of the error signal detection apparatus according to the present invention, when a radial tilt, tangential tilt, defocus, and detrack occur, respectively. As shown in FIGS. 11A, 11C, and 11D, the radial tilt signal $R_{tilt}$ detected by the error signal detection apparatus, according to the third embodiment of the present invention, is almost unaffected by tangential tilt, defocus, and detrack, but is greatly affected by the radial tilt, as shown in FIG. 11A.

Thus, a radial tilt error signal can be accurately detected without being affected by the tangential tilt, the defocus, and the detrack, using the error signal detection apparatus according to the third embodiment of the present invention.

Figure 12:
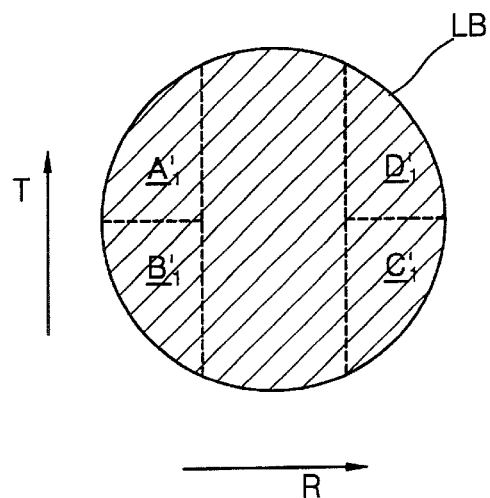
FIG. 12 illustrates a first through fourth light beam portions $A'_1$, $B'_1$, $C'_1$, and $D'_1$ of the light beam incident on the recording medium.
Figure 13:
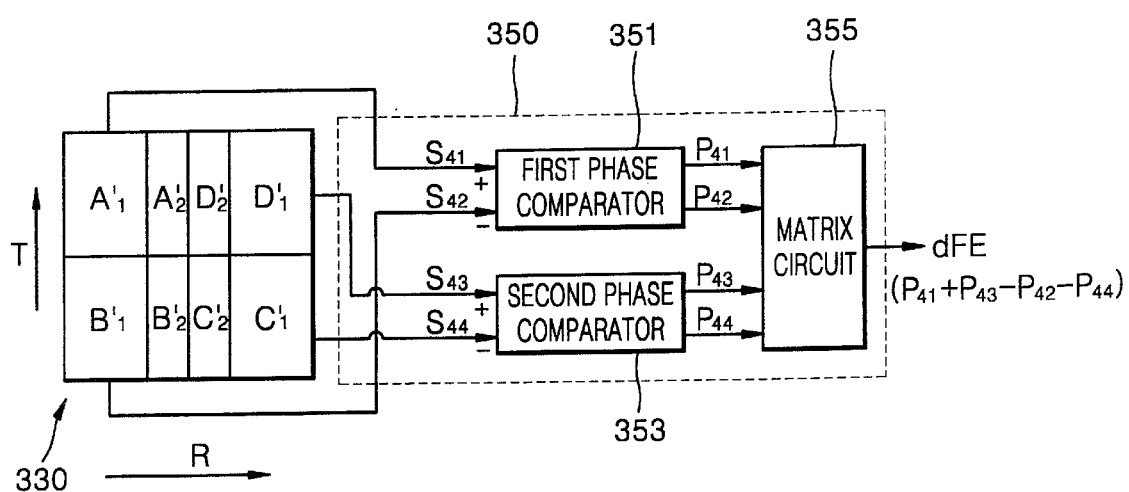
FIG. 13 illustrates a fourth embodiment of the error signal detection apparatus for the optical recording/reproducing system according to the present invention.

Referring to FIGS. 12 and 13, a fourth embodiment of the error signal detection apparatus according to the present invention, to detect a defocus error signal. The error signal detection apparatus includes a photodetecting unit 19 and a signal processor 350. The photodetecting unit 19 detects first through fourth light beam portions $A_1'$, $B_1'$, $C_1'$, and $D_1'$ from a part of the light beam LB passed through the objective lens 17, after being reflected/diffracted from the information stream of the recording medium 10, and outputs first, second, fourth, and third detection signals $S_{41}$, $S_{42}$, $S_{44}$, and $S_{43}$. The signal processor 350 outputs a sum signal of a phase difference between the first and second detection signals $S_{41}$ and $S_{42}$, and a phase difference between the third and fourth detection signals $S_{43}$ and $S_{44}$.

The first through fourth light beam portions $A_1'$, $B_1'$, $C_1'$, and $D_1'$ are formed as a 2×2 matrix and are arranged counterclockwise in order, where the row and column of the matrix are parallel to the R and T directions, respectively. For illustrative purposes, the first and second light beam portions $A_1'$ and $B_1'$ are located in one column, and the third and fourth light beam portions $C_1'$, and $D_1'$ are located in another column.

In the present embodiment, the first and fourth light beam portions $A_1'$ and $D_1'$ are separated at a predetermined distance from each other in the R direction, and the second and third light beam portions $B_1'$ and $C_1'$ are separated at a predetermined distance from each other in the R direction. In the present embodiment, assuming that the light beam LB is divided into a first outer portion, an intermediate light beam portion, and a second outer portion in the R direction, the photodetecting unit 19 is constructed such that the photodetecting unit 19 divides the first and second outer portions of the light beam LB into the first through fourth light beam portions $A_1'$, $B_1'$, $C_1'$, and $D_1'$ and detects the divided first through fourth light beam portions $A_1'$, $B_1'$, $C_1'$, and $D_1'$.

As shown in FIG. 13, the photodetecting unit 19 of the error signal detection apparatus, according to the fourth embodiment of the present invention may include a photodetector 330 formed as a 2×4 matrix. Here, the row and column of the matrix are parallel to the R and T directions of the recording medium, respectively. In FIG. 13, the defocus error signal dFE is detected using the detection signals from the first through fourth light beam portions $A_1'$, $B_1'$, $C_1'$, and $D_1'$ which are received by first through fourth outer light beam receiving sections $A_1'$, $B_1'$, $C_1'$, and $D_1'$ of the photodetector, 330 respectively.

The signal processor 350 includes a first phase comparator 351 receiving the first and second detection signals $S_{41}$ and $S_{42}$ detected from the first and second light beam portions $A_1'$ and $B_1'$, a second phase comparator 353 receiving the third and fourth detection signals $S_{43}$ and $S_{44}$ detected from the fourth and third light beam portions $D_1'$ and $C_1'$, and a matrix circuit 355. The matrix circuit 355 receives the first and second phase comparison signals $P_{41}$ and $P_{42}$ from the first phase comparator 351, and the third and fourth phase comparison signals $P_{43}$ and $P_{44}$ from the second phase comparator 353, and outputs a differential signal between a sum of the first and third phase comparison signals $P_{41}$ and $P_{43}$, and a sum of the second and fourth phase comparison signals $P_{42}$ and $P_{44}$, as the defocus error signal dFE $(=P_{41}+P_{43}-P_{42}-P_{44})$.

Figure 14A:
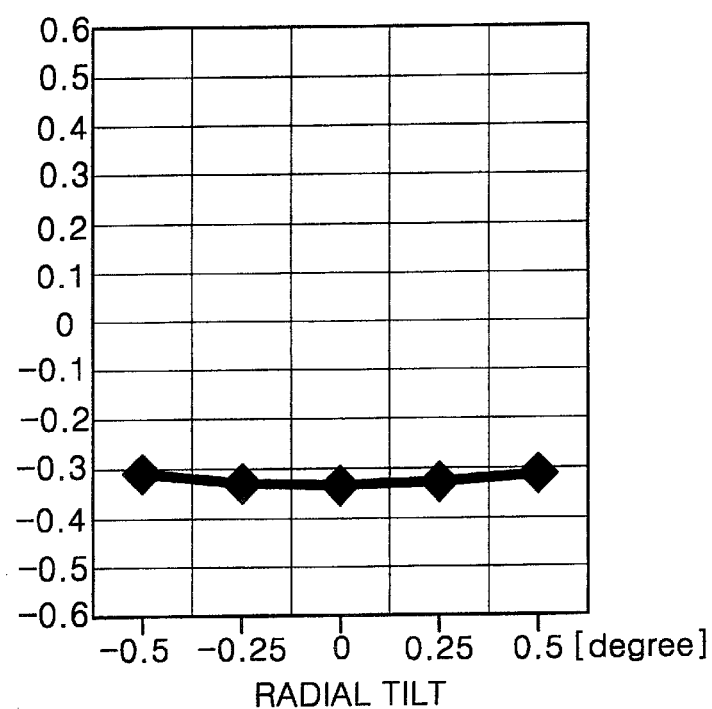
FIG. 14A is a graph illustrating a defocus error signal dFE output from the error signal detection apparatus of FIG. 13, when a radial tilt occurs.
Figure 14B:
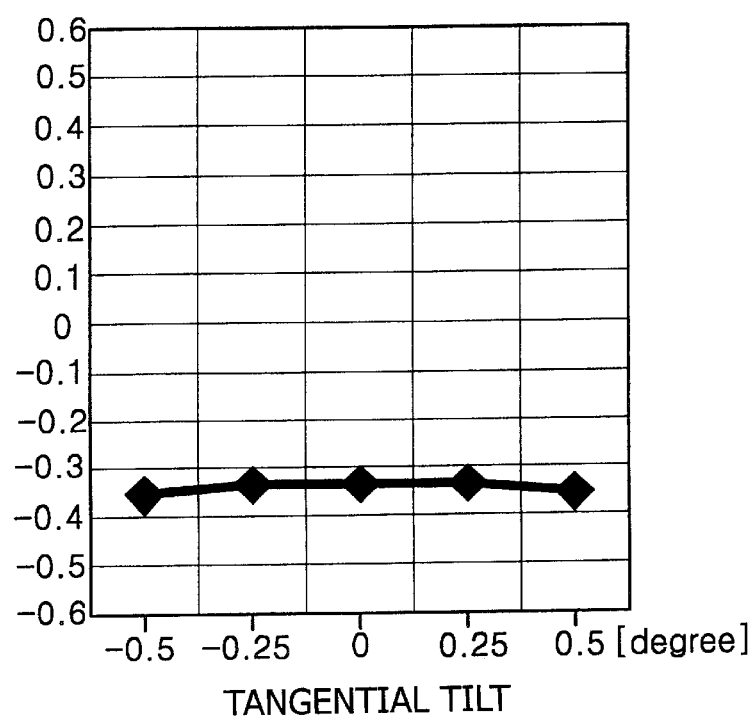
FIG. 14B is a graph illustrating the defocus error signal dFE output from the error signal detection apparatus of FIG. 13, when a tangential tilt occurs.
Figure 14C:
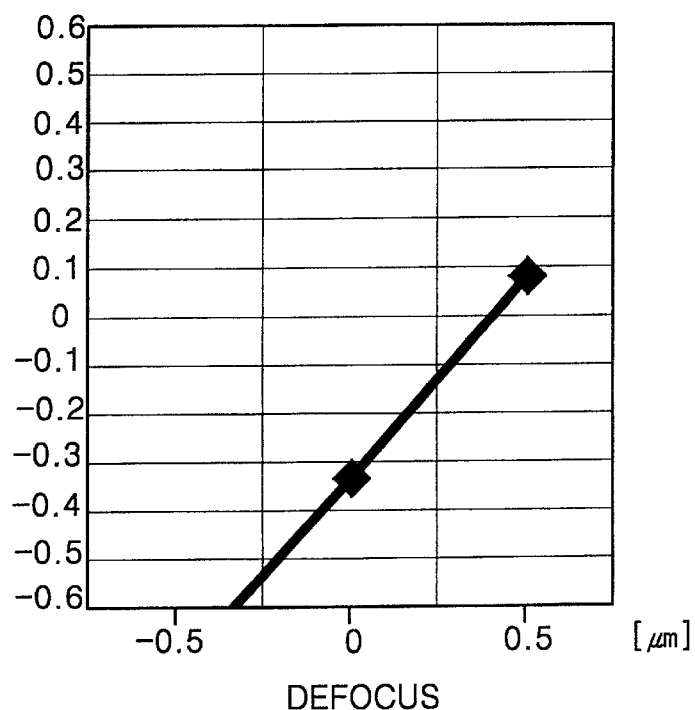
FIG. 14C is a graph illustrating the defocus error signal dFE output from the error signal detection apparatus of FIG. 13, when a defocus occurs.
Figure 14D:
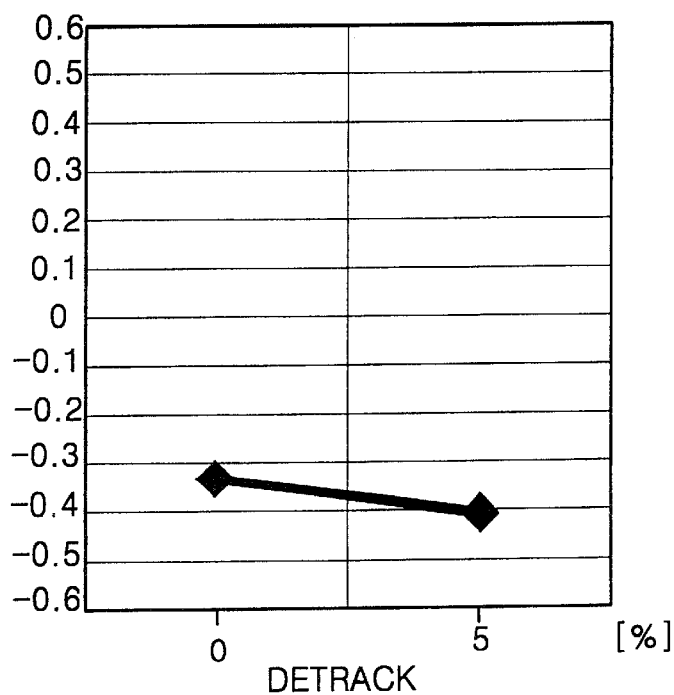
FIG. 14D is a graph illustrating the defocus error signal dFE output from the error signal detection apparatus of FIG. 13, when a detrack occurs.

FIGS. 14A through 14D are graphs illustrating the defocus error signal dFE output from the fourth embodiment of the error signal detection apparatus according to the present invention, when a radial tilt, tangential tilt, defocus, and detrack occur, respectively. As shown in FIGS. 14A, 14B, and 14D, the defocus error signal dFE detected by the error signal detection apparatus according to the fourth embodiment of the present invention is almost unaffected by the radial tilt, tangential tilt, and detrack, but is greatly affected by the defocus, as shown in FIG. 14C.

Thus, a defocus error signal can be accurately detected without being affected by the radial tilt, tangential tilt, and detrack, using the error signal detection apparatus according to the fourth embodiment of the present invention.

Figure 15:
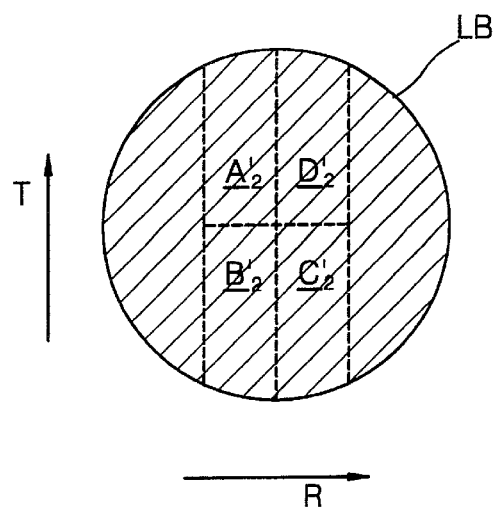
FIG. 15 illustrates a first through fourth light beam portions $A'_2$, $B'_2$, $C'_2$, and $D'_2$ of the light beam incident on the recording medium.
Figure 16:
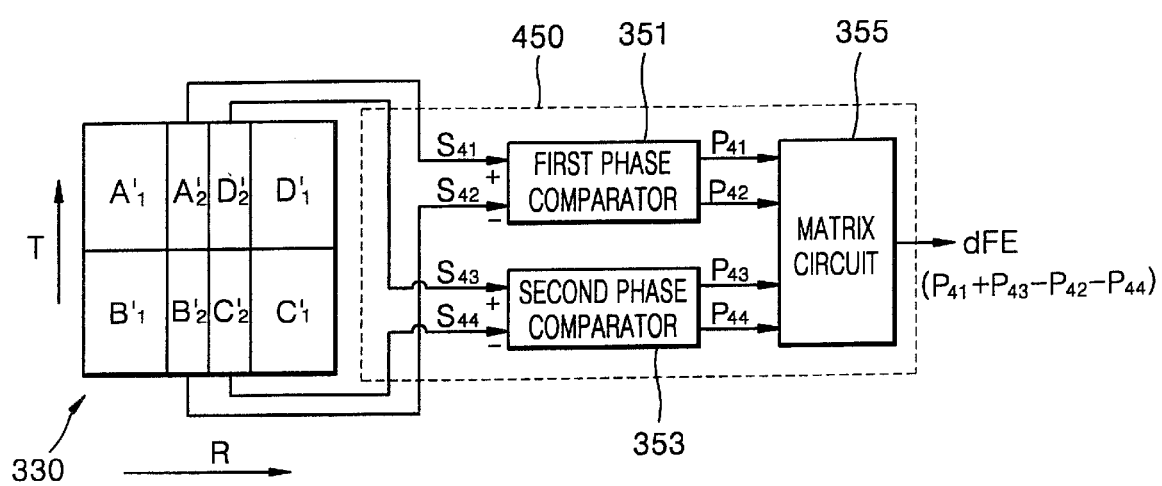
FIG. 16 illustrates a fifth embodiment of the error signal detection apparatus for the optical recording/reproducing system according to the present invention.

As shown in FIG. 15, a fifth embodiment of the error signal detection apparatus, according to the present invention, may use the intermediate light beam portion of the light beam LB, instead of the first and second outer portions, to detect the defocus error signal dFE. The fifth embodiment of the error signal detection apparatus according to the present invention detects the intermediate light beam portion of the light beam LB, divides the intermediate light beam portion into first through fourth light beam portions $A_2'$, $B_2'$, $C_2'$, and $D_2'$, and detects the defocus error signal dFE from the first through fourth light beam portions $A_2'$, $B_2'$, $C_2'$, and $D_2'$. Here, the first through fourth light beam portions $A_2'$, $B_2'$, $C_2'$, and $D_2'$ of the intermediate light beam portion of the light beam LB correspond to the inner portions of the first through fourth light beam portions $A_1'$, $B_1'$, $C_1'$, and $D_1'$ in the R direction, which form the first and second outer portions of the light beam LB. When the photodetector 330 having eight sections, as shown in FIG. 13, is used, the first through fourth light beam portions $A_2'$, $B_2'$, $C_2'$, and $D_2'$ divided from the intermediate light beam portion of the light beam LB, as shown in FIG. 16, are detected by the first through fourth inner light beam receiving sections $A_2'$, $B_2'$, $C_2'$, and $D_2'$, which are located inward from the first through fourth outer light beam receiving portions $A_1'$, $B_1'$, $C_1'$, and $D_1'$ of FIG. 13 in the R direction. First, second, fourth, and third detection signals $S_{41}$, $S_{42}$, $S_{44}$, and $S_{43}$ are detected by the first through fourth inner light beam receiving sections $A_2'$, $B_2'$, $C_2'$, and $D_2'$, respectively, and are processed by the signal processor 450 in the same way described in FIG. 13, and are output as the defocus error signal dFE.

Here, the structure of the signal processor 450 is the same as the signal processor 350 of FIG. 13, except that the detection signals $S_{41}$, $S_{42}$, $S_{43}$, and $S_{44}$, are detected by the first through fourth inner light beam receiving sections $A_2'$, $B_2'$, $C_2'$, and $D_2'$, rather than by the first through fourth outer light beam receiving sections $A_1'$, $B_1'$, $C_1'$, and $D_1'$. For this reason, the first, second, fourth, and third detection signals $S_{41}$, $S_{42}$, $S_{44}$, and $S_{43}$ detected by the first through fourth inner light beam receiving sections $A_2'$, $B_2'$, $C_2'$, and $D_2'$ are denoted by the same reference numerals as those detected by the first through fourth outer light beam receiving sections $A_1'$, $B_1'$, $C_1'$, and $D_1'$. Also, is structurally and functionally similar to the signal processor 350 of FIG. 13. Accordingly, a description of the signal processor 450 will be omitted.

Figure 17:
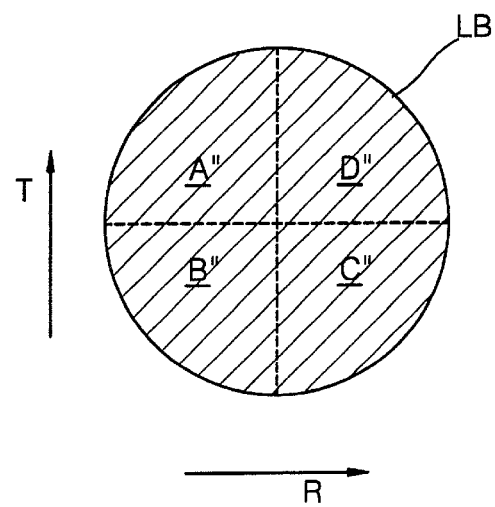
FIG. 17 illustrates a first through fourth light beam portions A", B", C", and D" of the light beam incident on the recording medium.
Figure 18:
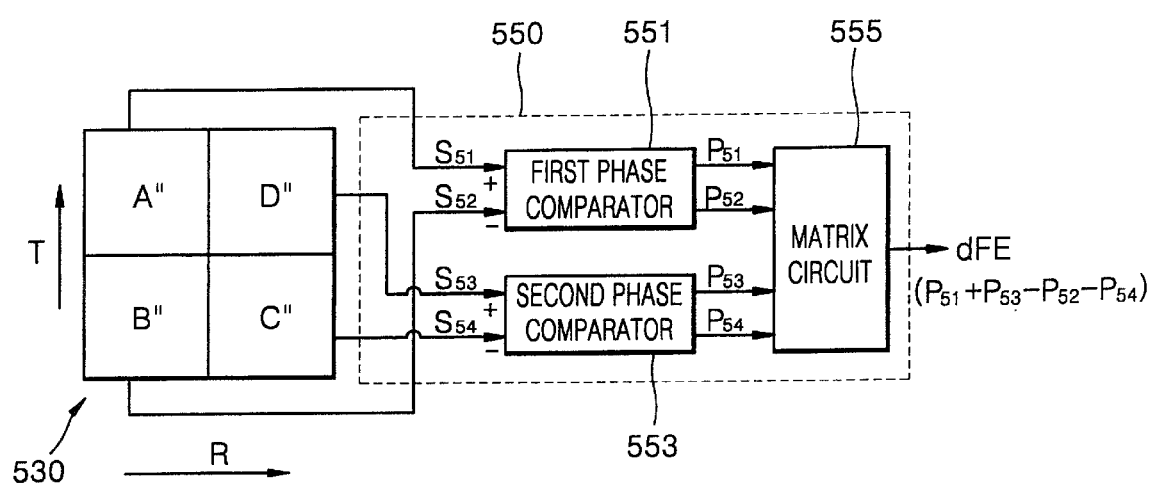
FIG. 18 illustrates a sixth embodiment of the error signal detection apparatus for the optical recording/reproducing system according to the present invention.

Referring to FIGS. 17 and 18, a sixth embodiment of the error signal detection apparatus according to the present invention divides the light beam LB into first through fourth light beam portions A", B", C", and D" in the R and T directions, and detects the first through fourth light beam portions A", B", C", and D" to generate first, second, fourth, and third detection signals $S_{51}$, $S_{52}$, $S_{54}$, and $S_{53}$ from the first through fourth light beam portions A", B", C", and D", respectively. The error signal detection apparatus detects a defocus error signal by summing a phase difference between the first and second detection signals $S_{51}$ and $S_{52}$, and a phase difference between the third and fourth detection signals $S_{53}$ and $S_{54}$.

The first through fourth light beam portions A", B", C", and D" are formed as a 2×2 matrix and are arranged counterclockwise in order, where the row and column of the matrix are parallel to the R and T directions, respectively. For illustrative purposes, the first and second light beam portions A" and B" are located in one column, and the third and fourth light beam portions C" and D" are located in another column.

As shown in FIG. 18, the photodetecting unit 19 in the error signal detection apparatus, according to the sixth embodiment of the present invention, may include a photodetector 530 having four sections, i.e., first through fourth light beam receiving sections A", B", C", and D", which receive the first through fourth light beam portions A", B", C", and D", respectively.

The first and second detection signals $S_{51}$ and $S_{52}$ from the first and second light beam receiving sections A" and B" are input to a first phase comparator 551 of the signal processor 550. The first phase comparator 551 outputs a first phase comparison signal $P_{51}$ if a phase of the first detection signal $S_{51}$ leads a phase of the second detection signal $S_{52}$, and a second phase comparison signal $P_{52}$ if the phase of the second detection signal $S_{52}$ leads the phase of the first detection signal $S_{51}$. The third and fourth detection signals $S_{53}$ and $S_{54}$ are input to a second phase comparator 553 in the signal processor 550. The second phase comparator 553 outputs a third phase comparison signal P53 if a phase of the third detection signal $S_{53}$ leads a phase of the fourth detection signal $S_{54}$, and a fourth phase comparison signal $P_{54}$ if a phase of the fourth detection signal $S_{54}$ leads a phase of the third detection signal $S_{53}$. The matrix circuit 555 receives the first through fourth phase comparison signals $P_{51}$, $P_{52}$, $P_{53}$, and $P_{54}$, and outputs a differential signal of a sum of the first and third phase comparison signals $P_{51}$ and $P_{53}$, and a sum of the second and fourth phase comparison signals $P_{52}$ and $P_{54}$, as the defocus error signal dFE ($=P_{51}+P_{52}-P_{53}-P_{54}$).

Like the error signal detection apparatus according to the fourth embodiment of the present invention, the error signal detection apparatuses according to the fifth and sixth embodiments of the present invention, which have the above structures, can detect the defocus error signal dFE without being affected by the radial tilt, the tangential tilt, and the detrack.

Figure 19:
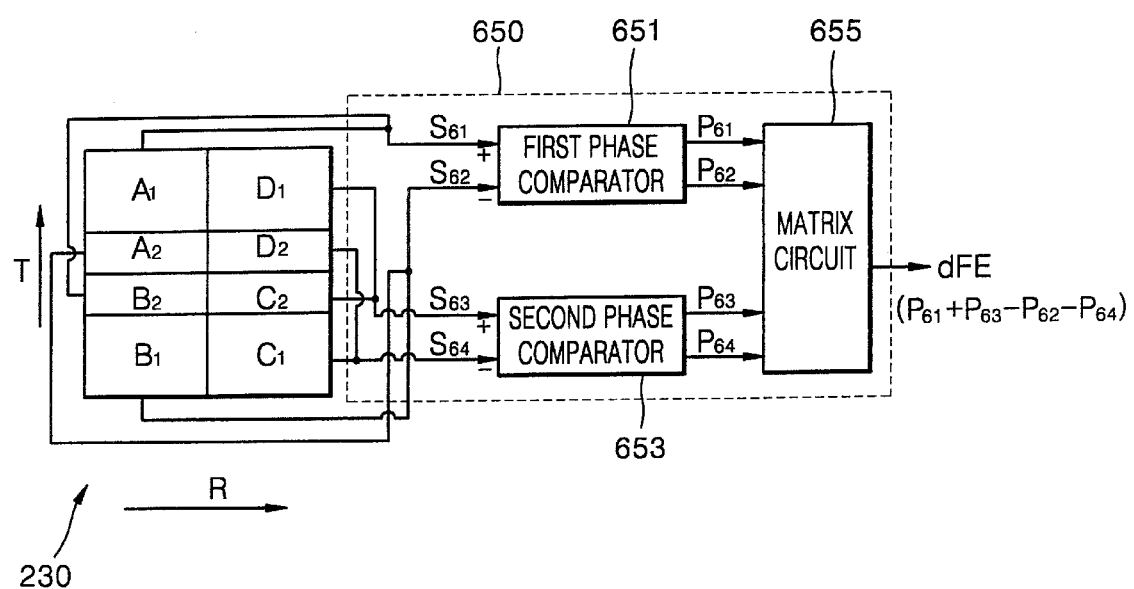
FIG. 19 illustrates a seventh embodiment of the error signal detection apparatus for the optical recording/reproducing system according to the present invention.

Referring to FIGS. 9 and 19, the light beam LB is divided into a first outer portion, an intermediate light beam portion, and a second outer portion in the T direction. The photodetecting unit of a seventh embodiment of the error signal detection apparatus according to the present invention, includes all the divided configurations of the light beam portions to be described in the following eighth and ninth embodiments of the present invention and may be constructed such that the photodetecting unit 19 divides the first and second outer portions of the light beam LB into first through fourth outer light beam portions $A_1$, $B_1$, $C_1$, and $D_1$, and the intermediate light beam portion into first through fourth inner light beam portions $A_2$, $B_2$, $C_2$, and $D_2$, and detects the light beam portions $A_1$, $B_1$, $C_1$, $D_1$, $A_2$, $B_2$, $C_2$, and $D_2$. The configuration of the divided light beam portions received by this photodetecting unit is the same as that of FIG. 9.

The photodetecting unit 19 of the error signal detection apparatus, according to the seventh embodiment of the present invention, may include a photodetector 230, which has the same structure as that of FIG. 10. For illustrative purposes, in the 4×2 matrix structure of the light beam LB, the first outer portion $A_1$ is located in the first row and first column. Alternatively, the first outer portion $A_1$ may be located in the fourth row and second column.

In the present embodiment, a signal processor 650 includes a first phase comparator 651 receiving first and second detection signals $S_{61}$ and $S_{62}$, a second phase comparator 653 receiving third and fourth detection signals $S_{63}$ and $S_{64}$, and a matrix circuit 655. The signal processor 650 outputs a sum of a phase difference between the first and second detection signals $S_{61}$ and $S_{62}$, and a phase difference between the third and fourth detection signals $S_{63}$ and $S_{64}$, as the defocus error signal dFE. The first detection signal $S_{61}$ is a sum of detection signals from the first outer light beam portion $A_1$ and the second inner light beam portion $B_2$. The second detection signal $S_{62}$ is a sum of detection signals from the second outer light beam portion $B_1$ and the first light beam inner portion $A_2$. The third detection signal $S_{63}$ is a sum of detection signals from the fourth outer light beam portion $D_1$ and the third inner light beam portion $C_2$. The fourth detection signal $S_{64}$ is a sum of detection signals from the fourth inner light beam portion $D_2$ and the third outer light beam portion $C_1$.

The matrix circuit 655 receives first and second phase comparison signals $P_{61}$ and $P_{62}$ from the first phase comparator 651, and third and fourth phase comparison signal $P_{63}$ and $P_{64}$ from the second phase comparator 653, and outputs a differential signal between a sum of the first and third phase comparison signals $P_{61}$ and $P_{63}$, and a sum of the second and fourth phase comparison signals $P_{62}$ and $P_{64}$, as the defocus error signal dFE($=P_{61}+P_{63}-P_{62}-P_{64}$).

Figure 20A:
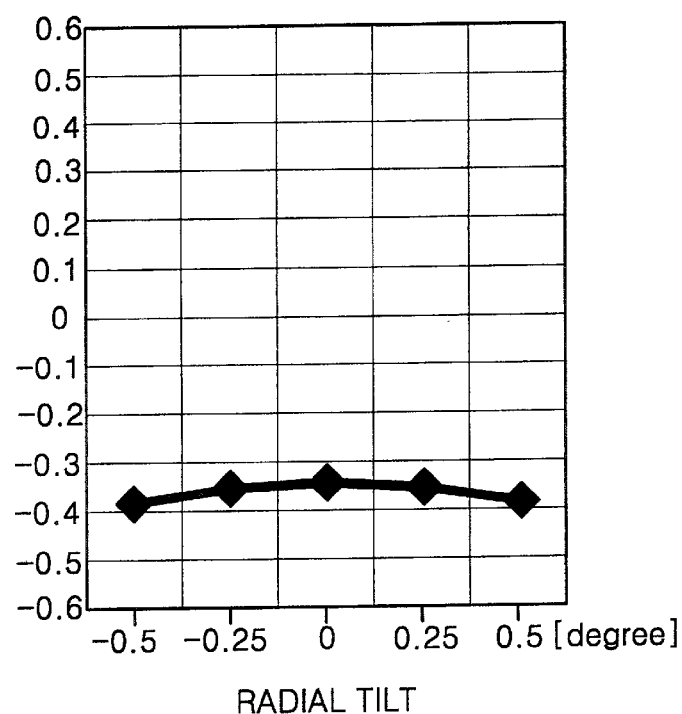
FIG. 20A is a graph illustrating a defocus error signal dFE output from the error signal detection apparatus of FIG. 19, when a radial tilt occurs.
Figure 20B:
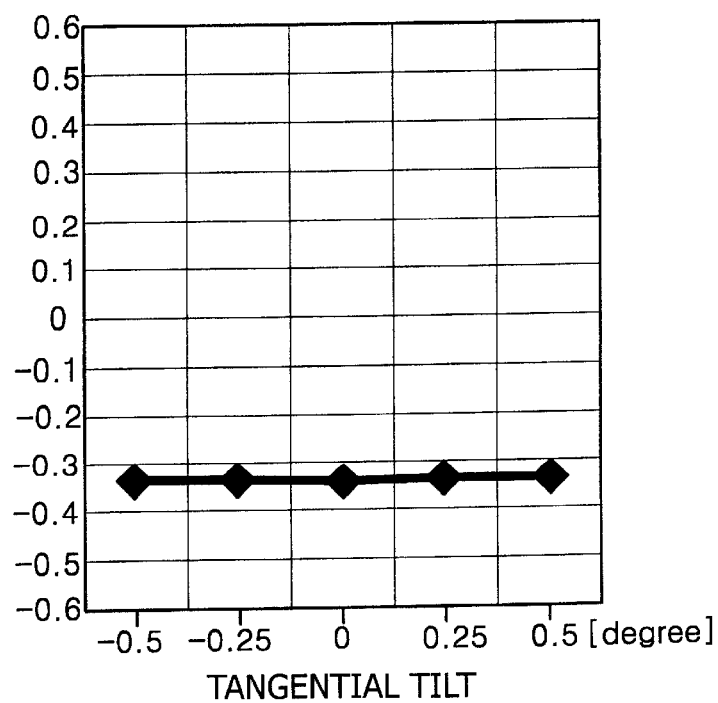
FIG. 20B is a graph illustrating the defocus error signal dFE output from the error signal detection apparatus of FIG. 19, when a tangential tilt occurs.
Figure 20C:
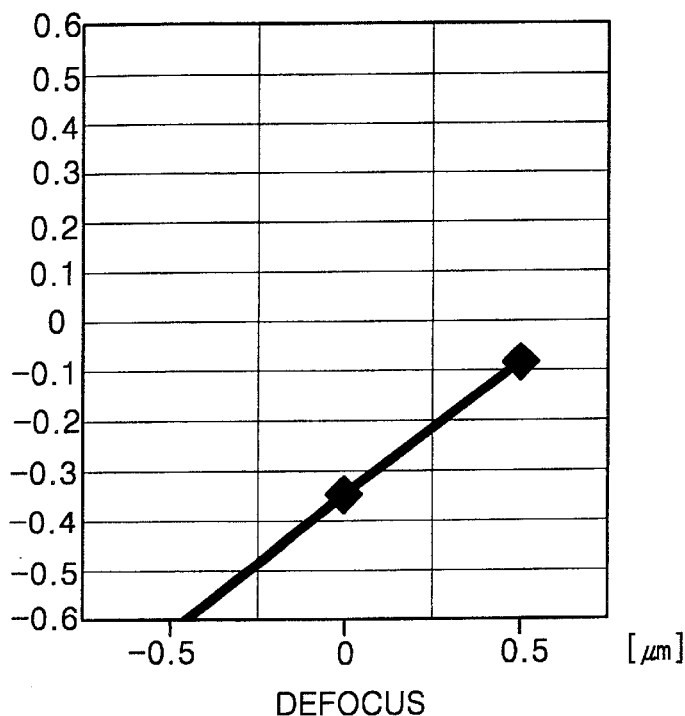
FIG. 20C is a graph illustrating the defocus error signal dFE output from the error signal detection apparatus of FIG. 19, when a defocus occurs.
Figure 20D:
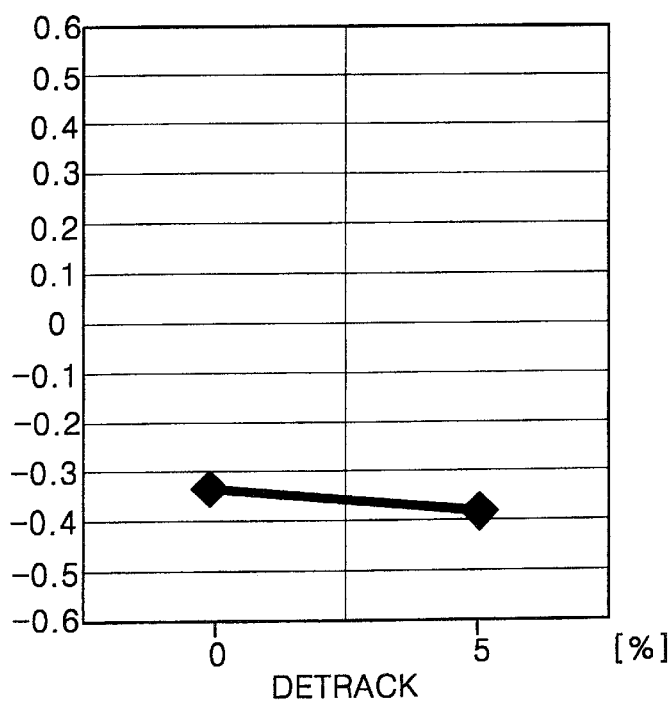
FIG. 20D is a graph illustrating the defocus error signal dFE output from the error signal detection apparatus of FIG. 19, when a detrack occurs.

FIGS. 20A through 20D are graphs illustrating the defocus error signal dFE output from the error signal detection apparatus according to the seventh embodiment of the present invention, when a radial tilt, tangential tilt, defocus, and detrack occur, respectively. As shown in FIGS. 20A, 20B, and 20D, the defocus error signal dFE detected by the error signal detection apparatus, according to the seventh embodiment of the present invention, is almost unaffected by the radial tilt, the tangential tilt, and the detrack, but is greatly affected by the defocus, as shown in FIG. 20C.

Thus, a defocus error signal can be accurately detected without being affected by radial tilt, tangential tilt, and detrack, using the error signal detection apparatus, according to the seventh embodiment of the present invention, having the above structure.

Figure 21:
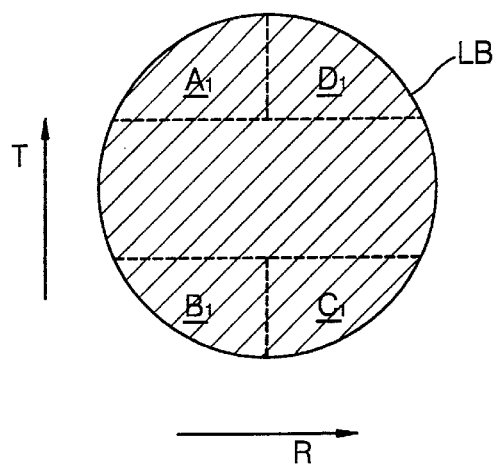
FIG. 21 illustrates a first through fourth light beam outer portions $A_1$, $B_1$, $C_1$, and $D_1$ of the light beam incident on the recording medium.
Figure 22:
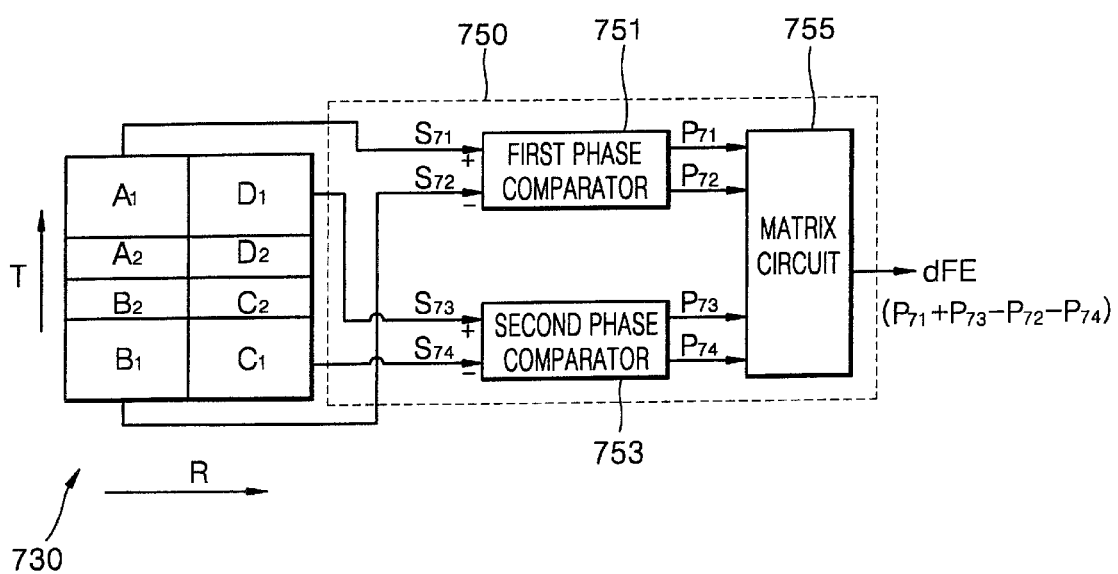
FIG. 22 illustrates an eighth embodiment of the error signal detection apparatus for the optical recording/reproducing system according to the present invention.

Referring to FIGS. 21 and 22, an eighth embodiment of the error signal detection apparatus, according to the present invention, includes the photodetecting unit 19 and a signal processor 750 and detects the defocus error signal dFE. The photodetecting unit 19 detects outer light beam portions, i.e., first through fourth light beam portions $A_1$, $B_1$, $C_1$, and $D_1$, of the light beam LB passed through the objective lens 17, after being reflected/diffracted from the information stream of the recording medium 10, and outputs first, second, fourth, and third detection signals $S_{71}$, $S_{72}$, $S_{74}$, and $S_{73}$. The signal processor 750 outputs a sum of a phase difference between the first and second detection signals $S_{71}$ and $S_{72}$, and a phase difference between the third and fourth detection signals $S_{73}$ and $S_{74}$.

The first through fourth light beam portions $A_1$, $B_1$, $C_1$, and $D_1$ are formed as a 2×2 matrix, and are arranged counterclockwise in order, where the row and column of the matrix are parallel to the R and T directions, respectively. For exemplary purposes, the first and second light beam portions $A_1$ and $B_1$ are located in the one column, and the third and fourth light beam portions $C_1$ and $D_1$ are located in another column.

In the present embodiment, the first and second light beam portions $A_1$ and $B_1$ are separated at a predetermined distance from each other in the T direction, and the third and fourth light beam portions $C_1$ and $D_1$ are separated at a predetermined distance from each other in the T direction. In other words, assuming that the light beam LB is divided into a first outer portion, an intermediate portion, and a second outer portion in the direction T, the photodetecting unit 19 receives the first and second outer portions of the light beam LB as the divided first through fourth light beam portions $A_1$, $B_1$, $C_1$, and $D_1$. The first through fourth light beam portions $A_1$, $B_1$, $C_1$, and $D_1$ correspond to first through fourth outer portions $A_1$, $B_1$, $C_1$, and $D_1$ illustrated in the seventh embodiment with reference to FIG. 9.

Thus, as shown in FIG. 22, the photodetecting unit 19 of the eighth embodiment of the error signal detection apparatus according to the present invention, may include a photodetector 730 formed as a 2×4 matrix having eight sections. Here, the row and column of the matrix are parallel to the R and T directions, respectively. The first through fourth light beam portions $A_1$, $B_1$, $C_1$, and $D_1$ are detected by first through fourth outer light beam receiving sections $A_1$, $B_1$, $C_1$, and $D_1$ of the photodetector 730.

The signal processor 750 includes a first phase comparator 751 receiving first and second detection signals $S_{71}$ and $S_{72}$ detected from the first and second light beam portions $A_1$ and $B_1$ and a second phase comparator 753 receiving third and fourth detection signals $S_{73}$ and $S_{74}$ detected from the fourth and third light beam portions $D_1$ and $C_1$. The signal processor 750 also includes a matrix circuit 755.

The matrix circuit 755 receives first and second phase comparison signals $P_{71}$ and $P_{72}$ from the first phase comparator 751, and third and fourth phase comparison signals $P_{73}$ and $P_{74}$ from the second phase comparator 753, and outputs a differential signal between a sum of the first and third phase comparison signals $P_{71}$ and $P_{73}$, and a sum of the second and fourth phase comparison signals $P_{72}$ and $P_{74}$, as the defocus error signal dFE ($=P_{71}+P_{73}-P_{72}-P_{74}$).

Figure 23:
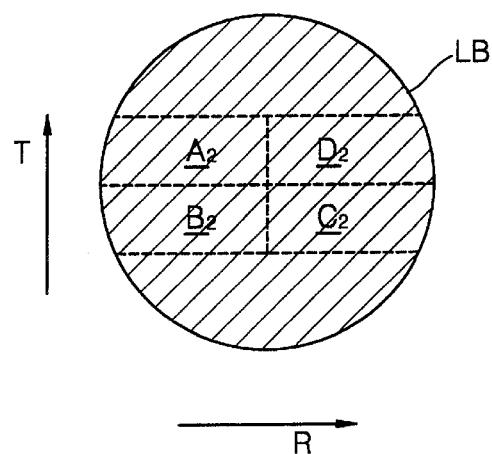
FIG. 23 illustrates a first through fourth light beam intermediate portions $A_1$, $B_1$, $C_1$, and $D_1$ of the light beam incident on the recording medium.

As shown in FIG. 23, a ninth embodiment of the error signal detection apparatus according to the present invention may use the intermediate light beam portion of the light beam LB, instead of the first and second outer portions, to detect the defocus error signal dFE. The ninth embodiment of the error signal detection apparatus, according to the present invention, detects the intermediate light beam portion of the light beam LB as divided first through fourth light beam portions $A_2$, $B_2$, $C_2$, and $D_2$, and detects the defocus error signal dFE from the first through fourth light beam portions $A_2$, $B_2$, $C_2$, and $D_2$. Here, the first through fourth light beam portions $A_2$, $B_2$, $C_2$, and $D_2$ of the intermediate light beam portion of the light beam LB correspond to the inner portions of the first through fourth light beam portions $A_1$, $B_1$, $C_1$, and $D_1$ in the T direction, which form the first and second outer portions of the light beam LB. The first through fourth light beam portions $A_2$, $B_2$, $C_2$, and $D_2$ correspond to the first through fourth inner portions $A_1$, $B_1$, $C_1$, and $D_1$ illustrated in the seventh embodiment with reference to FIG. 19.

Figure 24:
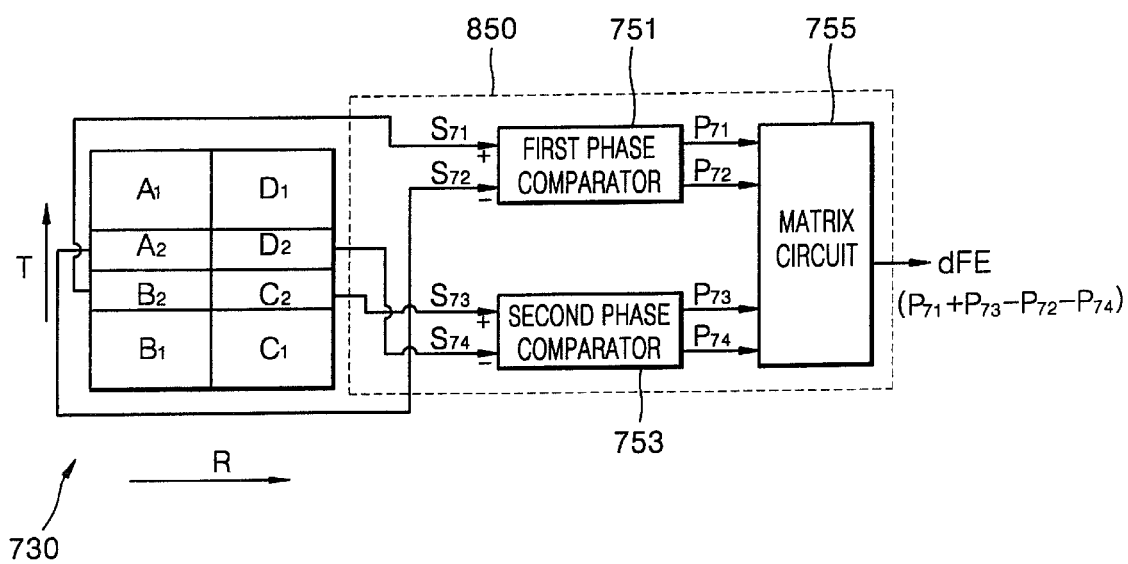
FIG. 24 illustrates a ninth embodiment of the error signal detection apparatus for the optical recording/reproducing system according to the present invention.

When the photodetector 730 having eight sections, as shown in FIG. 22, is used, the first through fourth light beam portions $A_1$, $B_1$, $C_1$, and $D_1$ corresponding to the intermediate light beam portion of the light beam LB, are detected by the first through fourth inner light beam receiving sections $A_2$, $B_2$, $C_2$, and $D_2$, as shown in FIG. 24. The first through fourth inner light beam receiving sections $A_2$, $B_2$, $C_2$, and $D_2$ are located inward from the first through fourth outer light beam receiving sections $A_1$, $B_1$, $C_1$, and $D_1$ of FIG. 22 in the T direction. Second, first, third and fourth detection signals $S_{72}$, $S_{71}$, $S_{73}$, and $S_{74}$ are detected by the first through fourth inner light beam receiving sections $A_2$, $B_2$, $C_2$, and $D_2$, respectively, and are processed by the signal processor 850 in the same way as described in FIG. 22, and are output as the defocus error signal dFE.

The structure of the signal processor 850 is the same as that of the signal processor 750 of FIG. 22, except that the second, first, third, and fourth detection signals $S_{72}$, $S_{71}$, $S_{73}$, and $S_{74}$ from the first through fourth inner light beam receiving sections $A_2$, $B_2$, $C_2$, and $D_2$, respectively, are input to the signal processor 850. For this reason, the elements of the signal processor 850 are denoted by the same reference numerals as those used by the signal processor 750, and, accordingly, a description of the structure of the signal processor 850 is the same as the description presented for the signal processor 750.

Like the error signal detection apparatus according to the seventh embodiment of the present invention, the error signal detection apparatuses according to the eighth and ninth embodiments of the present invention, which have the above configurations, can detect the defocus error signal dFE without being affected by the radial tilt, tangential tilt, and detrack.

Figure 25:
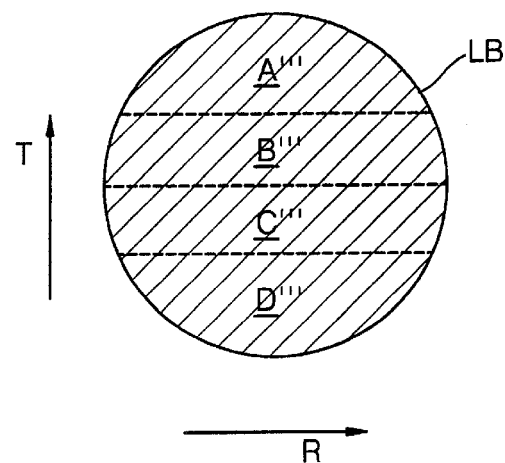
FIG. 25 illustrates a first through fourth light beam portions A'", B'", C'", and D'" of the light beam incident on the recording medium.
Figure 26:
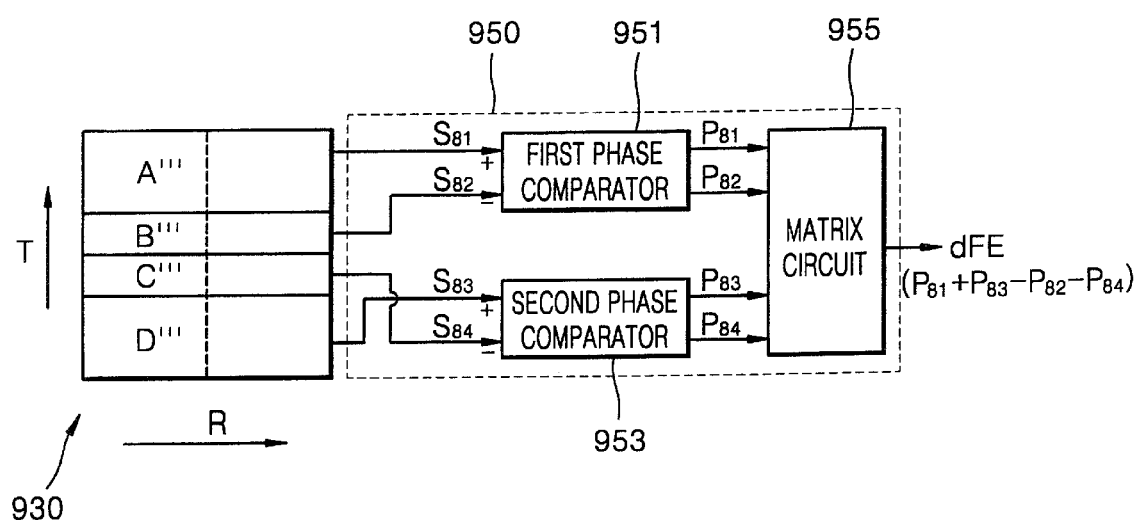
FIG. 26 illustrates a tenth embodiment of the error signal detection apparatus for the optical recording/reproducing system according to the present invention.

Referring to FIGS. 25 and 26, a tenth embodiment of the error signal detection apparatus for an optical recording/reproducing system according to the present invention includes the photodetecting unit 19 and a signal processor 950 and detects the defocus error signal dFE. The photodetecting unit 19 divides the light beam LB passed through the objective lens 17, after having been reflected/diffracted from the information stream of the recording medium 10, into first through fourth light beam receiving sections A''', B''', C''', and D''' in the T direction, and detects and outputs first, second, fourth, and third detection signals $S_{81}$, $S_{82}$, $S_{84}$, and $S_{83}$. The signal processor 950 outputs the sum of a phase difference between the first and second detection signals $S_{81}$ and $S_{82}$, and a phase difference between the third and fourth detection signals $S_{83}$ and $S_{84}$.

As shown in FIG. 26, the photodetecting unit 19 of the tenth embodiment of the error signal detection apparatus, according to the present invention, may include a photodetector 930 having the first through fourth light beam receiving sections A''', B''', C''', and D''', which divide the light beam LB into first through fourth light beam portions A''', B''', C''', and D''', respectively, in the T direction, and separately and photoelectrically convert the first through fourth light beam portions A''', B''', C''', and D'''. The first through fourth light beam receiving sections A''', B''', C''', and D''' are short in the T direction with large widths in the R direction. The first through fourth light beam receiving sections A''', B''', C''', and D''' separately and photoelectrically convert the first through fourth light beam portions A''', B''', C''', and D''' of the light beam LB incident after having been reflected/diffracted from the recording medium 10, and output first, second, fourth, and third detection signals $S_{81}$, $S_{82}$, $S_{83}$, and $S_{84}$, respectively.

Here, the light beam LB is a main light beam used for recording information on the recording medium, or reproducing information from the recording medium, and the photodetector 930 is also used for detecting the information signal from the recording medium 10. In this case, for exemplary purposes, the first through fourth light beam receiving sections A''', B''', C''', and D''' of the photodetector 930 are further divided into two sections in the T direction along the dashed lines of FIG. 26, so that the photodetector 930 has eight light beam receiving sections.

The signal processor 950 includes a first phase comparator 951, which receives the first and second detection signals $S_{81}$ and $S_{82}$, a second phase comparator 953 that receives the third and fourth detection signals $S_{83}$ and $S_{84}$, and a matrix circuit 955. The matrix circuit 955 receives first and second phase comparison signals $P_{81}$ and $P_{82}$ from the first phase comparator 953, and third and fourth phase comparison signals $P_{82}$ and $P_{84}$ from the second phase comparator 953, and outputs a differential signal between a sum of the first and third phase comparison signals $P_{81}$ and $P_{83}$, and a sum of the second and fourth phase comparison signals $P_{82}$ and $P_{84}$, as the defocus error signal dFE ($=P_{81}+P_{83}-P_{82}-P_{84}$).

Figure 27A:
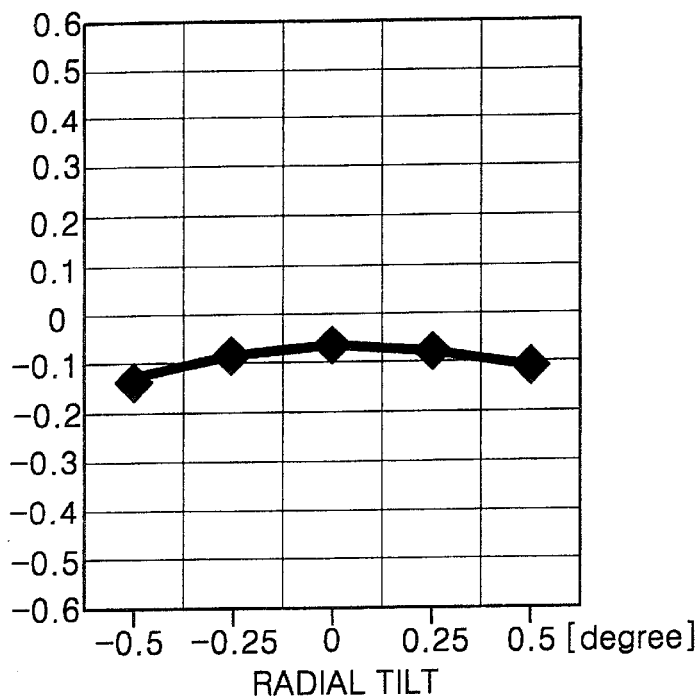
FIG. 27A is a graph illustrating a defocus error signal dFE output from the error signal detection apparatus of FIG. 26, when a radial tilt occurs.
Figure 27B:
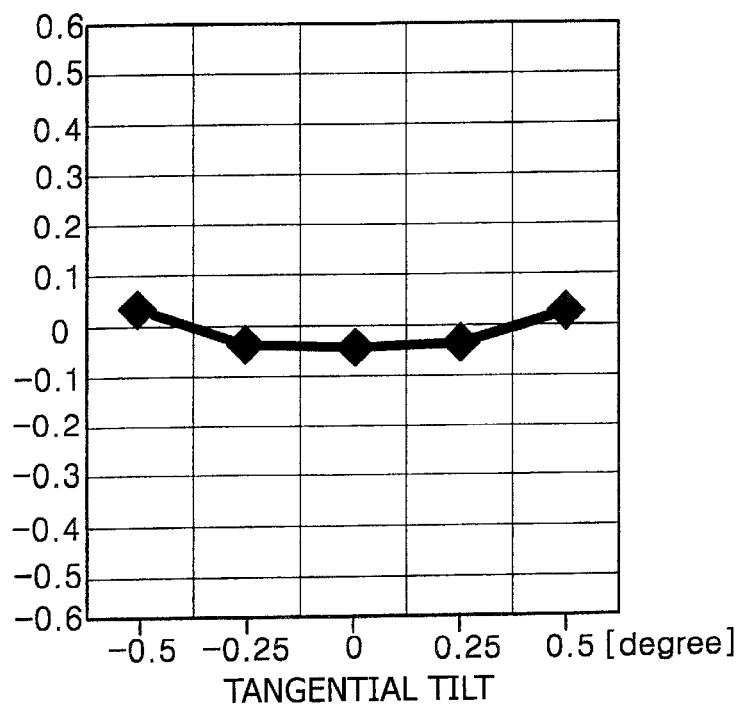
FIG. 27B is a graph illustrating the defocus error signal dFE output from the error signal detection apparatus of FIG. 26, when a tangential tilt occurs.
Figure 27C:
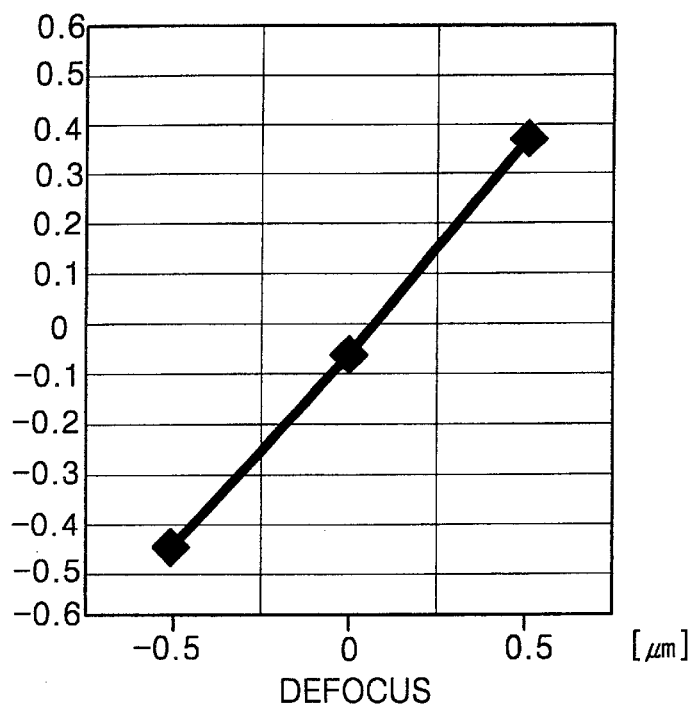
FIG. 27C is a graph illustrating the defocus error signal dFE output from the error signal detection apparatus of FIG. 26, when a defocus occurs.
Figure 27D:
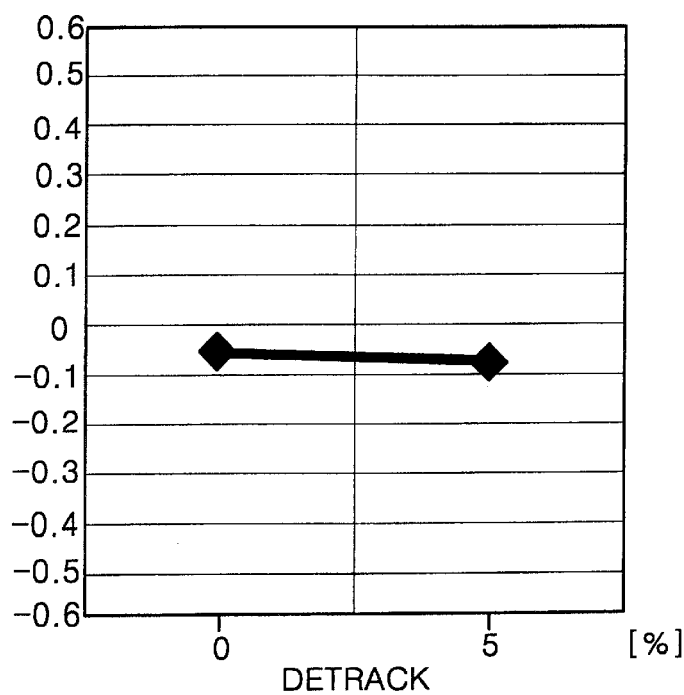
FIG. 27D is a graph illustrating the defocus error signal dFE output from the error signal detection apparatus of FIG. 26, when a detrack occurs.

FIGS. 27A through 27D are graphs illustrating the defocus error signal dFE from the tenth embodiment of the error signal detection apparatus according to the present invention, when a radial tilt, tangential tilt, defocus, and detrack occur, respectively. As shown in FIGS. 27A, 27B, 27C, and 27D, the defocus error signal dFE detected by the error signal detection apparatus according to the tenth embodiment of the present invention, is almost unaffected by radial tilt, tangential tilt, and detrack, but is greatly affected by defocus, as shown in FIG. 27C.

Thus, a defocus error signal can be accurately detected without being affected by the radial tilt, the tangential tilt, and the detrack, using the tenth embodiment of the error signal detection apparatus, according to the present invention, having the above structure.

A DC offset of the defocus error signals dFE detected by the error signal detection apparatuses according to the fourth, fifth, and seventh through tenth embodiments of the present invention may be removed by adjusting a light beam division ratio of the photodetecting unit, or using a circuit.

The above error signal detection apparatuses according to the present invention, which are for detecting the defocus error signal dFE, use the light beam LB passed through the objective lens 17 after being reflected/diffracted from the information stream of the recording medium 10.

When a defocus component of the optical recording/reproducing system is detected using the defocus error signal detection apparatuses according to the present invention, which are described with reference to FIGS. 12 through 29, a recording medium may be used having a defocus error signal value lower than a predetermined value in a defocus-free state, i.e., where no defocus occurs, and which is detected by the signal processors 350, 450, 550, 650, 750, 850, 950, and 1050 for detecting a defocus error signal, according to the present invention.

Assuming that a channel clock interval of an information signal recorded on a recording medium is T, and an average time interval of the detection signals input to the phase comparators of the signal processor 350, 450, 550, 650, 750, 850, 950, or 1050, is $\Delta t$, the recording medium may be designed such that, in the defocus-free state, $\Delta t/T$ represents a defocus error signal value which is 0.5–1.0 with respect to the range of the depth of focus of the light beam LB used in the optical recording/reproduction system.

The average time interval $\Delta t$ refers to an average of time intervals of the detection signals input to the phase comparators, which have been detected from the information stream (for example, from 3T to 14T record marks or pits) by scanning the light beam LB. In general, a range of a depth of focus is substantially determined by $\lambda/NA^2$, where $\lambda$ is a wavelength of the light source used, and NA is the numerical aperture of the objective lens.

The error signal detection apparatuses according to the fourth through tenth embodiments of the present invention, which have the above configurations, detect a defocus error signal using a phase detection method, so that the defocus error signal dFE can be detected with high sensitivity, irrespective of an intensity of the light beam reflected from the recording medium.

The detected defocus error signal may be used to remove any defocus component when initializing the optical recording/reproducing system, and to compensate for a component, which cannot be easily detected as an S-curve in the recording medium containing a large deflection component.

The error signal detection apparatuses according to the fourth through tenth embodiments of the present invention detect a defocus error signal, for example, by phase detection from the light beam LB diffracted from pits, so that the defocus component can be detected irrespective of the type of recording medium, or a particular layer of the recording medium having a plurality of layers.

Figure 28:
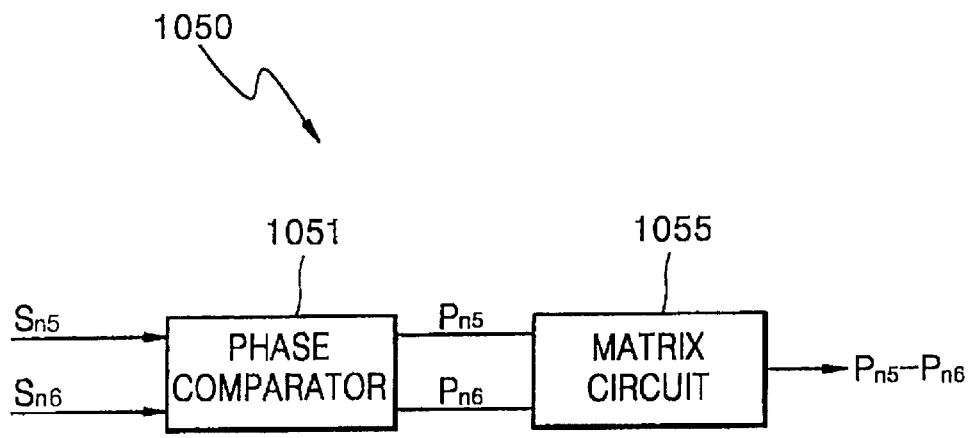
FIG. 28 illustrates an alternative embodiment of a signal processor for the error signal detection apparatus of FIGS. 4, 7, 10, 13, 16, 18, 19, 22, 23, and/or 24.

Although, in the error signal detection apparatuses according to the first through ninth embodiments of the present invention, which have the above structures, the signal processor 50, 150, 250, 350, 450, 550, 650, 750, 850, or 950 is constructed to process the individual first through fourth detection signals $S_{n1}$, $S_{n2}$, $S_{n3}$, and $S_{n4}$ (where n=1, 2, ..., 8), which are input to the phase comparators of the error signal detection apparatuses according to the first through ninth embodiments, the signal processor 1050 may be constructed to process a fifth detection signal, $S_{n5}$, as the sum of the first and third detection signals $S_{n1}$ and $S_{n3}$, and a sixth detection signal, $S_{n6}$, as a sum of the second and fourth detection signals $S_{n2}$ and $S_{n4}$, as shown in FIG. 28. In this case, the signal processor 1050 includes a phase comparator 1051 receiving the sum signals ($S_{n1}+S_{n3}$) and ($S_{n2}+S_{n4}$) and outputting a fifth phase comparison signal $P_{n5}$ if a phase of the sum signal ($S_{n1}+S_{n3}$) leads a phase of the sum signal ($S_{n2}+S_{n4}$), and a sixth phase comparison signal $P_{n6}$ if a phase of the sum signal ($S_{n2}+S_{n4}$) leads a phase of the sum signal ($S_{n1}+S_{n3}$), and a matrix circuit 1055 outputting a differential signal between the fifth and sixth phase comparison signals $P_{n5}$ and $P_{n6}$.

Although it is described that the error signal detection apparatuses according to the present invention, detect a particular kind of error signal, i.e., a tangential tilt error signal, a radial tilt error signal, or a defocus error signal, the error signal detection apparatuses according to the first through tenth embodiments of the present invention, may be combined such that the error signal detection apparatuses can simultaneously detect two or three kinds of error signals. For example, if the error signal detection apparatuses according to the present invention have a photodetecting unit that detects the light beam reflected/diffracted from a recording medium as eight divided light beam portions in a 2×4 matrix, both tangential tilt and defocus error signals may be detected. This exemplary embodiment would include a combination of the first and fourth embodiments or of the second and fourth embodiments according to the present invention Also, if the error signal detection apparatuses according to the present invention have a photodetecting unit that detects the light beam reflected/diffracted from a recording medium as eight divided light beam portions in a 4×2 matrix, which would be a combination of the third and seventh embodiments, or of third and ninth embodiments according to the present invention, both the radial tilt and the defocus error signals can be detected.

Figure 29:
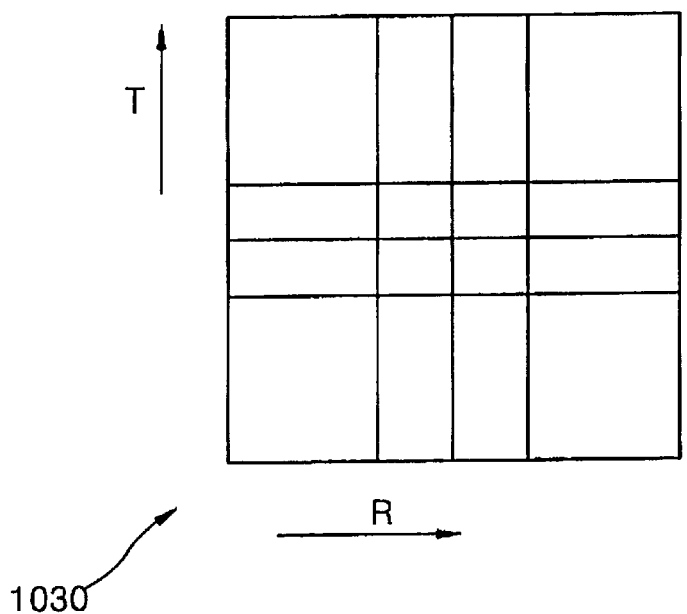
FIG. 29 illustrates an alternative embodiment of a photodetecting unit for the error signal detection apparatus of FIGS. 4, 7, 10, 13, 16, 18, 19, 22, 23, and/or 24.

Also, if the error signal detection apparatuses, according to the present invention, have a photodetecting unit that detects the light beam reflected/diffracted from a recording medium as sixteen divided light beam portions in a 4×4 matrix, which may be implemented by a photodetector 1030 having sixteen divided sections by combining the previous embodiments, as shown in FIG. 29, the tangential tilt, the radial tilt, and the defocus error signals can be detected.

In the embodiments previously described, a photodetector having divided sections is used as a photodetecting unit. However, the photodetecting unit may include a light beam dividing element (not shown) and a photodetector (not shown) corresponding to the light beam dividing element. In this case, the light beam dividing element may be a diffraction element having a plurality of diffraction portions, for example, a hologram optical element (HOE), such that the light beam LB reflected/diffracted from a recording medium is divided into a plurality of light beam portions, as shown in FIGS. 3, 6, 9, 12, 15, 17, 12, 21 and/or 25. Each of the diffracted light beam portions would diffract a corresponding incident light beam portion into, +1st or −1st order diffracted beam and would transmit the diffracted beam, so that the light beam LB is divided into a plurality of light beam portions. The direction of diffraction patterns, and the pitch interval are designed corresponding to the structure of a photodetector.

As described previously, the embodiments of the error signal detection apparatuses according to the present invention, may be used when an optical elements that affects the distribution of an intensity of a light beam reflected/diffracted from a recording medium is disposed between the exit pupil of an objective lens and a photodetecting unit is not installed.

In a case where an optical element, such as a lens and/or an HOE, which affects the distribution of intensity of a light beam reflected/diffracted from a recording medium, is interposed between an objective lens and a photodetecting unit, the structures of the photodetecting unit and a signal processor of an error signal detection apparatus, according to the present invention, can be varied corresponding to a variation of distribution of the light beam caused by the optical element. In this case, when the optical element affects the distribution of the intensity of the light beam is interposed between the objective lens and the photodetecting unit, error signals detected by the appropriately modified signal processor are the same as those described in the above embodiments.

As previously described, the error signal detection apparatuses according to the present invention can accurately detect a tangential tilt error signal without being affected by radial tilt, defocus, and detrack, a radial tilt error signal without being affected by tangential tilt, defocus, and detrack, and/or a defocus error signal without being affected by tangential tilt, radial tilt, and detrack.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. An error signal detection apparatus for an optical recording/reproducing system comprising a light source emitting a light beam and an objective lens focusing the light beam to form a light spot on a recording medium, the apparatus comprising:

a photodetecting unit dividing at least a part of the light beam passed through the objective lens after being reflected/diffracted from an information stream of the recording medium into light beam portions, and detecting the light beam portions; and a signal processor detecting phase differences between detection signals from the light beam portions to detect a tangential tilt error signal, wherein the photodetecting unit divides the light beam into first, second, third, and fourth light beam portions in a direction corresponding to a radial direction of the recording medium, and detects and outputs first, second, fourth, and third detection signals from the first, second, third, and fourth light beam portions, and the signal processor detects and outputs the tangential tilt error signal as a sum of a phase difference between the first and second detection signals and a phase difference between the third and fourth detection signals, detects a phase difference between a fifth detection signal which is a sum of the first and third detection signals, and a sixth detection signal which is a sum of the second and fourth detection signals, compares a phase of the fifth detection signal with a phase of the sixth detection signal, and outputs a fifth phase comparison signal when the phase of the fifth detection signal leads the phase of the sixth detection signal, and a sixth phase comparison signal when the phase of the sixth detection signal leads the phase of the fifth detection signal.

2. The error signal detection apparatus of claim 1, wherein the photodetecting unit comprises a photodetector having eight light beam receiving sections in a 2×4 matrix, each light beam receiving section performing photoelectrical conversion.

3. The error signal detection apparatus of claim 1, wherein the signal processor comprises:

a first phase comparator comparing a phase of the first detection signal with a phase of the second detection signal, and outputting a first phase comparison signal when the phase of the first detection signal leads the phase of the second detection signal, and a second phase comparison signal when the phase of the second detection signal leads the phase of the first detection signal;

a second phase comparator comparing a phase of the third detection signal with the phase of the fourth detection signal, and outputting a third phase comparison signal when the phase of the third detection signal leads the phase of the fourth detection signal, and a fourth phase comparison signal when the phase of the fourth detection signal leads the phase of the third detection signal, and a matrix circuit receiving the first, second, third, and fourth phase comparison signals, and outputting a differential signal between the sum of the first and third phase comparison signals, and the sum of the second and fourth phase comparison signals.

4. The error signal detection apparatus of claim 1, wherein the signal processor comprises:

a phase comparator to compare the phase of the fifth detection signal with the phase of the sixth detection signal, and to output the fifth phase comparison signal and the sixth phase comparison signal; and a matrix circuit receiving the fifth and sixth phase comparison signals and outputting a differential signal between the fifth and sixth phase comparison signals.

5. An error signal detection apparatus for an optical recording/reproducing system comprising a light source emitting a light beam and an objective lens focusing the light beam to form a light spot on a recording medium, the apparatus comprising:

a photodetecting unit dividing at least a part of the light beam passed through the objective lens after being reflected/diffracted from an information stream of the recording medium into light beam portions, and detecting the light beam portions; and a signal processor detecting phase differences between detection signals from the light beam portions to detect a tangential tilt error signal, wherein the photodetecting unit divides a part of the light beam with respect to an axis crossing an optical axis parallel to a tangential direction of the recording medium, and detects therefrom first, second, third, and fourth light beam portions in directions corresponding to a radial direction and the tangential direction of the recording medium, where the first, second, third, and fourth light beam portions are arranged in order, counterclockwise or clockwise in a 2×2 matrix and where a row and a column of the matrix are parallel to directions corresponding to the radial and tangential directions of the recording medium, respectively, and the signal processor detects and outputs the tangential tilt error signal as a sum of a phase difference between the first and second detection signals corresponding to the first and third light beam portions, respectively, and a phase difference between third and fourth detection signals corresponding to the second and fourth light beam portions, respectively, detects a phase difference between a fifth detection signal which is a sum of the first and third detection signals, and a sixth detection signal which is a sum of the second and fourth detection signals, compares a chase of the fifth detection signal with a chase of the sixth detection signal, and outputs a fifth phase comparison signal when the phase of the fifth detection signal leads the phase of the sixth detection signal, and a sixth phase comparison signal when the phase of the sixth detection signal leads the phase of the fifth detection signal.

6. The error signal detection apparatus of claim 5, wherein the photodetecting unit comprises a photodetector having eight light beam receiving sections in a 2×4 matrix, each light beam receiving section performing photoelectrical conversion.

7. The error signal detection apparatus of claim 5, wherein the signal processor comprises:

a first phase comparator comparing a phase of the first detection signal with a phase of the second detection signal, and outputting a first phase comparison signal when the phase of the first detection signal leads the phase of the second detection signal, and a second phase comparison signal when the phase of the second detection signal leads the phase of the first detection signal;

a second phase comparator comparing a phase of the third detection signal with a phase of the fourth detection signal, and outputting a third phase comparison signal when the phase of the third detection signal leads the phase of the fourth detection signal, and a fourth phase comparison signal when the phase of the fourth detection signal leads the phase of the third detection signal, and a matrix circuit receiving the first, second, third, and fourth phase comparison signals, and outputting a differential signal between the sum of the first and third phase comparison signals, and the sum of the second and fourth phase comparison signals.

8. The error signal detection apparatus of claim 5, wherein the signal processor comprises:

a phase comparator to compare the phase of the fifth detection signal with the phase of the sixth detection signal, and to output the fifth phase comparison signal and the sixth phase comparison signal; and a matrix circuit receiving the fifth and sixth phase comparison signals and outputting a differential signal between the fifth and sixth phase comparison signals.

9. An error signal detection apparatus for an optical recording/reproducing system comprising a light source emitting a light beam and an objective lens focusing the light beam to form a light spot on a recording medium, the apparatus comprising:

a photodetecting unit dividing at least a part of the light beam passed through the objective lens after being reflected/diffracted from an information stream of the recording medium into light beam portions, and detecting the light beam portions; and a signal processor detecting phase differences between detection signals from the light beam portions to detect a tangential error signal, wherein the signal processor comprises:

a first phase comparator comparing a phase of the first detection signal with a phase of the second detection signal, and outputting a first phase comparison signal when the phase of the first detection signal leads the phase of the second detection signal, and a second phase comparison signal when the phase of the second detection signal leads the phase of the first detection signal;

a second phase comparator comparing a phase of the third detection signal with a phase of the fourth detection signal, and outputting a third phase comparison signal when the phase of the third detection signal leads the phase of the fourth detection signal, and a fourth phase comparison signal when the phase of the fourth detection signal leads the phase of the third detection signal, and a matrix circuit receiving the first, second, third, and fourth phase comparison signals, and outputting a differential signal between a sum of the first and third phase comparison signals, and a sum of the second and fourth phase comparison signals.

10. The error signal detection apparatus of claim 9, wherein the photodetecting unit comprises a photodetector having eight light beam receiving sections in a 2×4 matrix, each light beam receiving section performing photoelectrical conversion.

* * * * *

UNITED STATES PATENT AND TRADEMARK OFFICE
CERTIFICATE OF CORRECTION

PATENT NO.     : 6,754,146 B2
DATED          : June 22, 2004
INVENTOR(S)    : Byung-in Ma et al.

It is certified that error appears in the above-identified patent and that said Letters Patent is hereby corrected as shown below:

<u>Title page, Item [54] and Column 1, lines 1-3,</u>
Title, please change the following:
-- AN ERROR SIGNAL DETECTION APPARTUS OF AN OPTICAL RECORDING/REPRODUCING SYSTEM TO DETECT A TANGENTIAL TILT ERROR SIGNAL, A RADIAL TILT ERROR SIGNAL, AND/OR A DEFOCUS ERROR SIGNAL --

<u>Column 23,</u>
Lines 63 and 64, delete "chase" and insert -- phase --.

Signed and Sealed this

Eighteenth Day of January, 2005

JON W. DUDAS
*Director of the United States Patent and Trademark Office*